(12) United States Patent
Matsubara

(10) Patent No.: US 8,334,852 B2
(45) Date of Patent: Dec. 18, 2012

(54) POSITION DETECTING DEVICE

(75) Inventor: Masaki Matsubara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 373 days.

(21) Appl. No.: 12/820,643

(22) Filed: Jun. 22, 2010

(65) Prior Publication Data

US 2010/0327889 A1  Dec. 30, 2010

(30) Foreign Application Priority Data

Jun. 29, 2009  (JP) .................................. 2009-154203

(51) Int. Cl.
*G06F 3/044* (2006.01)

(52) U.S. Cl. ....................................... 345/174; 345/173

(58) Field of Classification Search .................. None
See application file for complete search history.

(56) References Cited

U.S. PATENT DOCUMENTS

| 5,861,875 A | 1/1999 | Gerpheide | |
|---|---|---|---|
| 2008/0170046 A1* | 7/2008 | Rimon et al. | 345/174 |
| 2010/0110040 A1* | 5/2010 | Kim et al. | 345/174 |

FOREIGN PATENT DOCUMENTS

JP  10020992 A  1/1998

* cited by examiner

*Primary Examiner* — Joseph Haley
(74) *Attorney, Agent, or Firm* — Seed IP Law Group PLLC

(57) ABSTRACT

A selector switch is provided which always connects a receiving side electrode to one of a positive electrode input terminal and a negative electrode input terminal of a differential amplifier section. This selector switch is controlled so as to form a positive electrode region in which a plurality of electrode elements connected to the positive electrode input terminal are arranged, a negative electrode region in which a plurality of electrode elements connected to the negative electrode input terminal are arranged, and an insensitive region in which electrode elements are alternately connected to the positive electrode input terminal and the negative electrode input terminal.

9 Claims, 15 Drawing Sheets

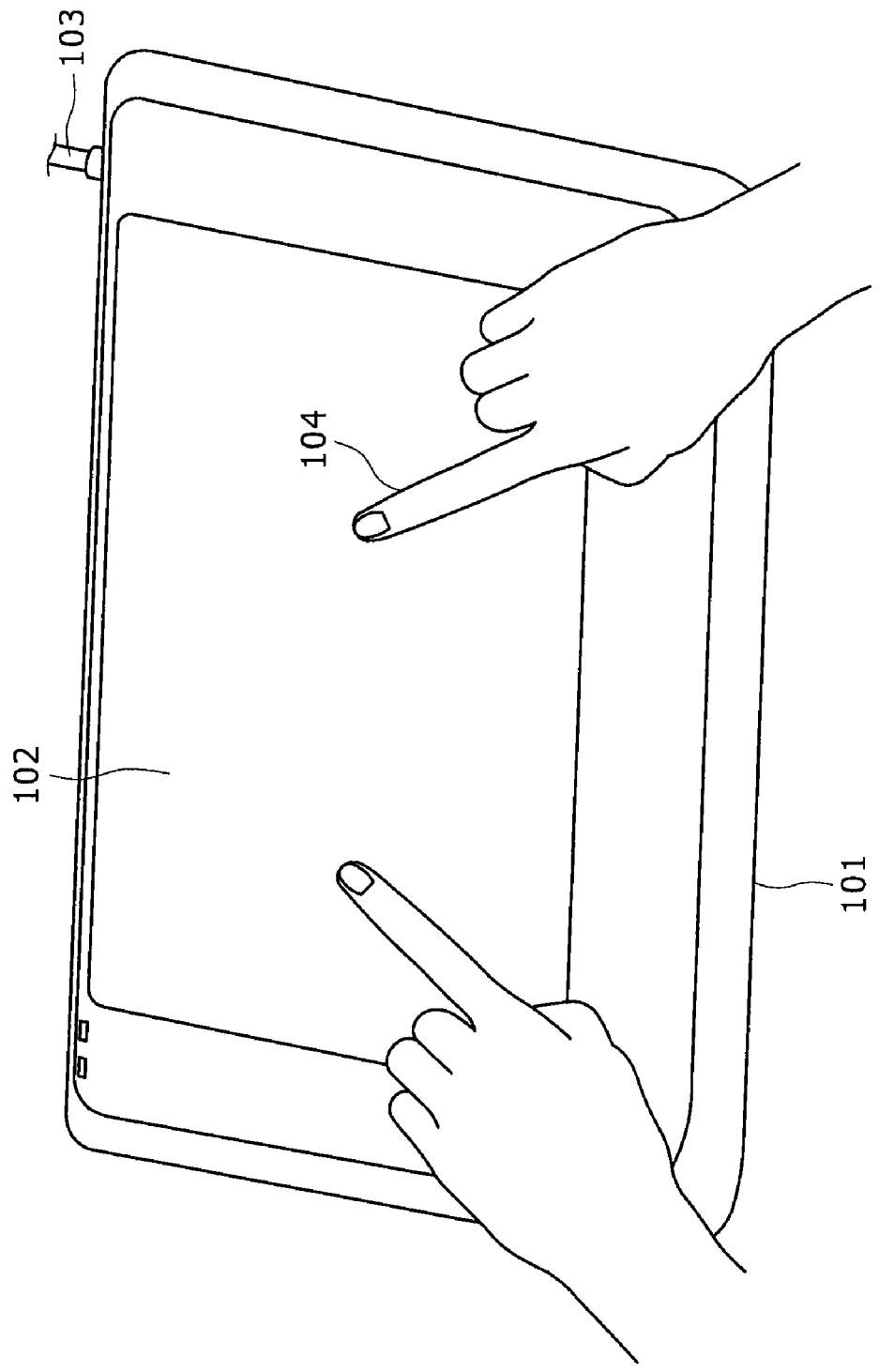

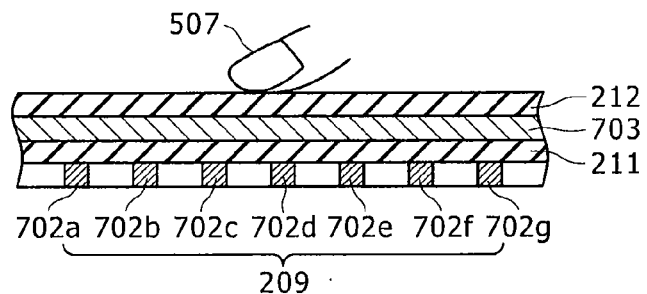
FIG.7A
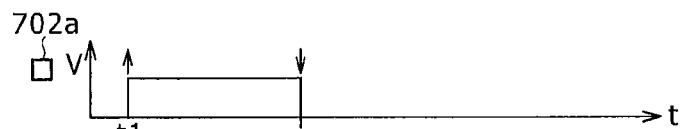
FIG.7B
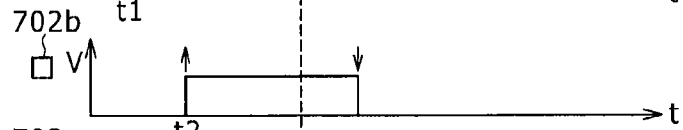
FIG.7C
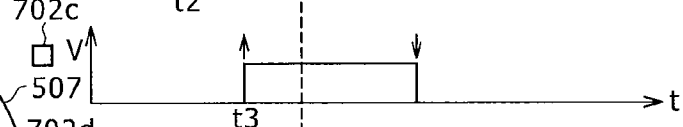
FIG.7D
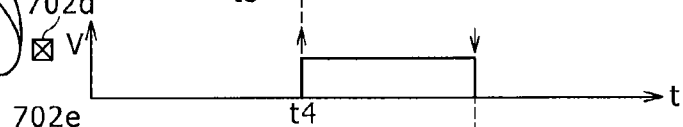
FIG.7E
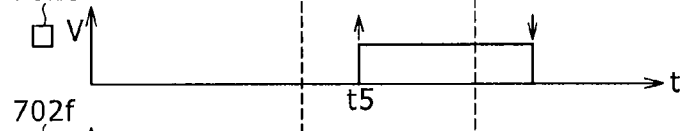
FIG.7F
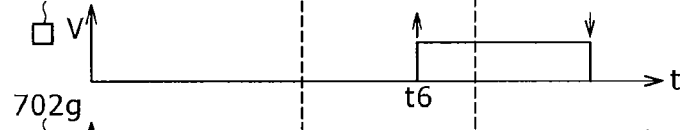
FIG.7G
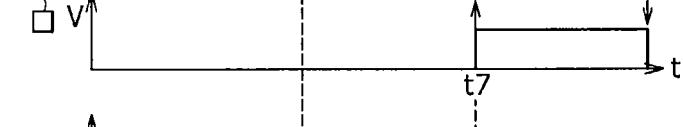
FIG.7H
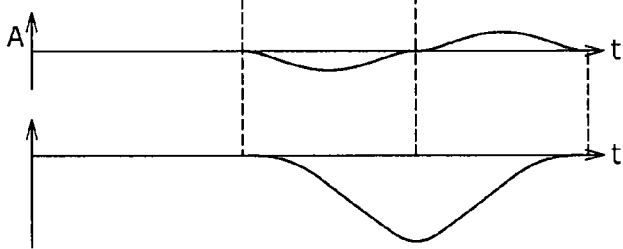
FIG.7I
FIG.7J FIG.11A FIG.11B FIG.11C FIG.11D FIG.11E FIG.11F FIG.11G FIG.11H FIG.11I FIG.11J FIG.11K FIG.11L FIG.11M FIG.11N FIG.11O FIG.11P FIG.11Q FIG.11R FIG.11S

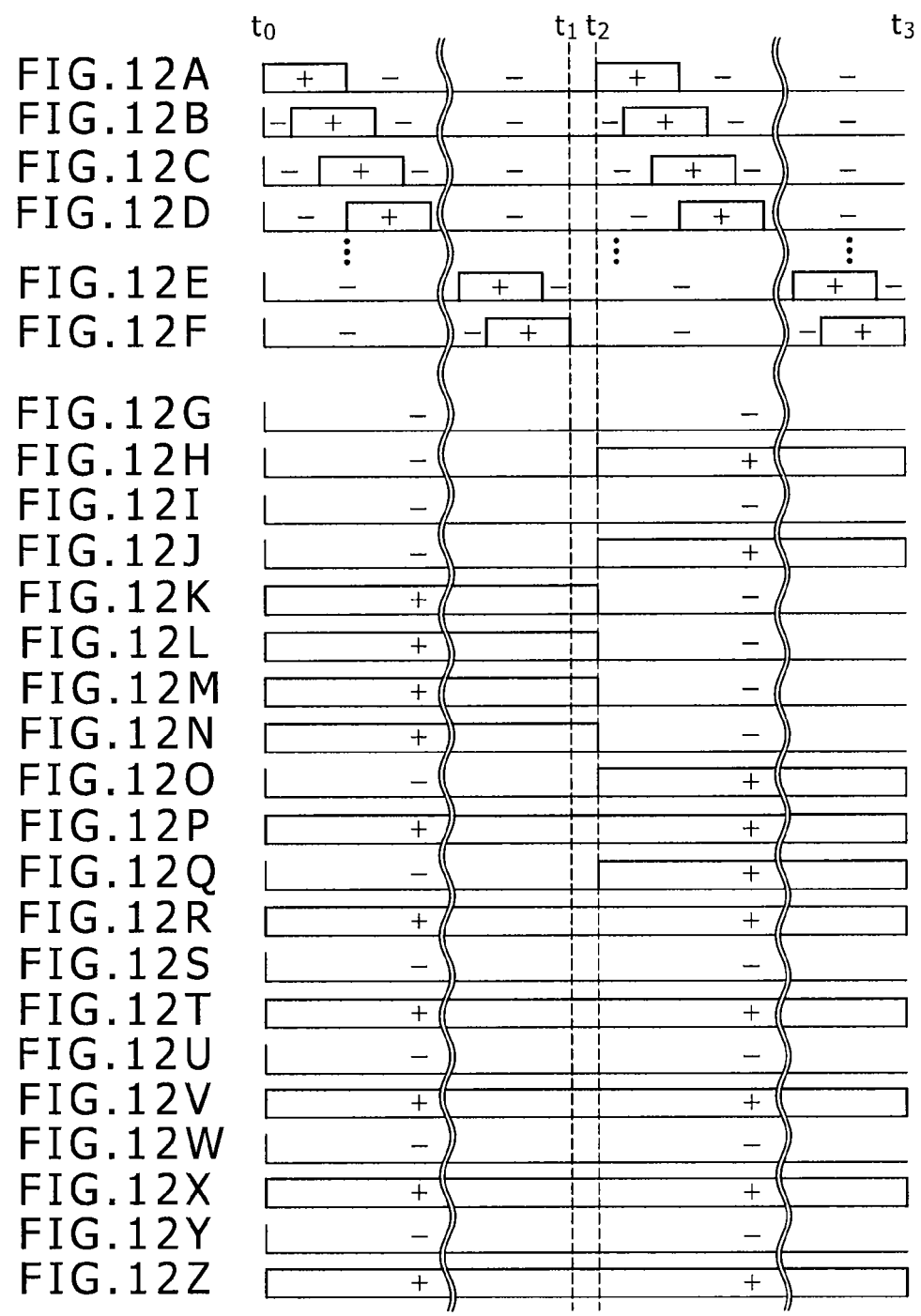

US 8,334,852 B2

POSITION DETECTING DEVICE

CROSS-REFERENCE TO RELATED APPLICATION(S)

The present application claims priority to Japanese Patent Application No. 2009-154203, filed Jun. 29, 2009, the entire content of which is incorporated herein by reference.

BACKGROUND OF THE INVENTION

1. Field of the Invention

The present invention relates to a technique suitable for application to a position detecting device, and particularly to a technique for improving scanning speed in a position detecting plane of a capacitance type position detecting device.

2. Description of the Related Art

There are various input devices for supplying positional information to a computer. Among the input devices, there is a position detecting device referred to as a touch panel.

A touch panel is a position detecting device allowing operation of a computer or the like by touching a detecting plane with an indicating object such as a finger, a dedicated stylus, or the like. The touch panel is widely used in PDAs (Personal Digital Assistants), ATMs (Automated Teller Machines) in banks, ticket vending machines in railroad stations, and the like.

There are various positional information detecting techniques employed in the touch panel. These are, for example, a resistive film system that detects a position on the basis of a change in pressure applied against a position detecting plane, a capacitance system that detects a position on the basis of a change in capacitance of a film in a surface of a position detecting plane, and the like.

Description will be made of a position detecting device based on the capacitance system as a conventional technique of the present invention.

FIG. 15 is a block diagram showing a conventional capacitance type position detecting device.

A driving section 1502 generates an alternating voltage of 200 kHz, which frequency is considered to be most readily absorbed by a human body, for example. The alternating voltage of 200 kHz generated by the driving section 1502 is selectively applied to electrodes 209 in an X-axis direction (which electrodes will hereinafter be referred to as "X-axis electrodes") in a sensor substrate 203 through a transmission selecting switch 1503.

The sensor substrate 203 has capacitors formed by arranging electrodes of long and narrow conductors vertically and horizontally and interposing an insulating sheet substantially in the form of a plate, which insulating sheet is not shown in the figure, between the electrodes arranged vertically and the electrodes arranged horizontally. The alternating voltage of 200 kHz is applied to these capacitors.

A reception selecting switch 1504 is a switch for determining an intersection forming a capacitor.

An output from the reception selecting switch 1504 is supplied to a preamplifier 1505, converted into digital data by an A/D converter 206, and then input to a position calculating section 207a.

Upon receiving address information obtained from a synchronizing clock generating section 1506 and the data on slight signal change, which data is obtained from the A/D converter 206, the position calculating section 207a formed by a microcomputer outputs information on the presence or absence of a finger on the sensor substrate 203 and positional information of the finger. Specifically, the position calculating section 207a subjects the data obtained from the A/D converter 206 to integration processing, and thereafter detects a peak value thereof. The position calculating section 207a then calculates a center of gravity on the basis of the calculated peak value and values preceding and succeeding the peak value. The position calculating section 207a then calculates the position of the finger on the basis of the position of the obtained center of gravity on a time axis.

Incidentally, for the convenience of description, the plurality of electrodes connected to the transmission selecting switch 1503 in the sensor substrate 203 will hereinafter be referred to collectively as an X-axis electrode 209, and the plurality of electrodes connected to the reception selecting switch 1504 in the sensor substrate 203 will hereinafter be referred to collectively as a Y-axis electrode 210.

Description will next be made of internal parts of the driving section 1502. The driving section 1502 includes a clock generator 1507, a readout section 1508, a sine wave ROM 1509, a D/A converter 1510, a low-pass filter (LPF) 1511, and a driver 1512.

The clock generator 1507 is an oscillator for generating a clock. The clock generated by the clock generator 1507 is supplied to the readout section 1508.

The sine wave ROM 1509 is a ROM (Read Only Memory) storing a pseudo sine wave of 8 bits×256 samples, for example. The readout section 1508 specifies an address in the sine wave ROM 1509 and reads out data on the basis of the clock supplied from the clock generator 1507.

The data read out from the sine wave ROM 1509 by the readout section 1508 is subjected to D/A conversion in the D/A converter 1510, and then input to the LPF 1511 to be smoothed in the LPF 1511. The data is thereby converted into an analog sine wave signal. The analog sine wave signal is subjected to voltage amplification in the driver 1512 to become the alternating voltage applied to the X-axis electrode 209.

Incidentally, conventional techniques related to the invention of the present applicant are shown in U.S. Pat. No. 5,861,875 (hereinafter referred to as Patent Document 1) and Japanese Patent Laid-Open No. Hei 10-20992 (hereinafter referred to as Patent Document 2).

SUMMARY OF THE INVENTION

There has recently been a desire to detect a plurality of fingers on an input surface simultaneously as a new user interface method. Methods for realizing such detection include a method of sequentially detecting a plurality of fingers present on an input surface on a time division basis, for example.

Patent Document 1 discloses technical contents such that a Y-axis electrode on a receiving side is roughly divided into two or more regions, all electrodes belonging to the divided regions are connected to the positive side input terminal and the negative side input terminal of a differential amplifier, and a boundary between the regions is moved. However, this method cannot detect the presence of a plurality of fingers well.

In Patent Document 2, all electrodes forming a Y-axis electrode on a receiving side are connected with two analog electronic switches, and the switches are connected with the positive side input terminal and the negative side input terminal of a differential amplifier section. When both of the two analog electronic switches are shut off, an "insensitive region" where the presence of a finger cannot be detected can be provided on a position plane. Thus, as compared with Patent Document 1, the presence of a plurality of fingers can be detected. However, this method needs to change the electrodes of the Y-axis electrode to not only a state of being connected to the positive side input terminal of the differential amplifier section and a state of being connected to the negative side input terminal of the differential amplifier section but also a state of not being connected to either terminal of the differential amplifier section. Thus, control becomes more complex, and the number of parts is increased.

The present invention has been made in view of such difficulties. According to one aspect, the present invention provides a position detecting device that surely and quickly detects the presence of a plurality of fingers on an input surface with a minimum circuit configuration.

According to an embodiment of the present invention, there is provided a position detecting device including: a plurality of conductors arranged in parallel with each other in a first direction and supplied with a predetermined signal; a plurality of conductors arranged in parallel with each other in a second direction orthogonal to the first direction; a signal detecting circuit including a differential amplifier circuit for subjecting an input signal to differential amplification; and a conductor selecting circuit for selectively connecting the plurality of conductors arranged in parallel with each other in the second direction to the differential amplifier circuit; wherein the conductor selecting circuit selects the plurality of conductors arranged in parallel with each other in the second direction with passage of time such that of the plurality of conductors arranged in parallel with each other in the second direction, M (M>=2) conductors adjacent to each other are connected to one input terminal of the differential amplifier circuit, N (N>=2) conductors adjacent to each other, the N conductors being in proximity to the M conductors adjacent to each other, are connected to another input terminal of the differential amplifier circuit, and 2P (P>=1) conductors adjacent to each other among the conductors excluding the M conductors and the N conductors, the number P being set smaller than N, are divided into first and second groups of conductors, each group including P conductor(s), and the first group of P conductor(s) are connected to said first input terminal of said differential amplifier circuit and the second group of P conductor(s) are connected to said second input terminal of the differential amplifier circuit.

According to the present invention, it is possible to provide a position detecting device that can surely and quickly detect the presence of a plurality of fingers on an input surface with a minimum circuit configuration.

BRIEF DESCRIPTION OF THE DRAWINGS

FIG. 1 is an external perspective view of a position detecting device according to an embodiment of the present invention;

FIG. 7A is a partial cross-sectional view of a matrix electrode and FIGS. 7B to 7J are diagrams showing a state of voltage applied to an X-axis electrode, a current waveform generated, and a current integral waveform;

FIGS. 11A to 11S are diagrams showing switch data generated and output by the switch data generating section;

FIGS. 12A to 12Z are timing diagrams showing changes in the states of the X-axis electrode and a Y-axis electrode;

DETAILED DESCRIPTION OF THE PREFERRED EMBODIMENTS

An embodiment of the present invention will hereinafter be described with reference to FIGS. 1 to 14.

FIG. 1 is an external perspective view of a position detecting device according to an embodiment of the present invention. The position detecting device 101 according to the present invention has a flat-panel shape. A rectangular position detecting plane 102 is provided in the upper surface of the position detecting device 101. A sensor substrate (not shown) to be described later is provided directly under the position detecting plane 102. The position detecting device 101 is for example connected to an external device not shown in the figure such as a personal computer, a PDA (Personal Digital Assistant) or the like via a cable 103. The position detecting device 101 is thereby used as an input device for these devices.

When a finger 104 comes into contact with the position detecting plane 102, the position detecting device 101 outputs a position at which the finger 104 is in contact with the position detecting plane 102 as positional information to the external device via the cable 103.

Figure 2A:
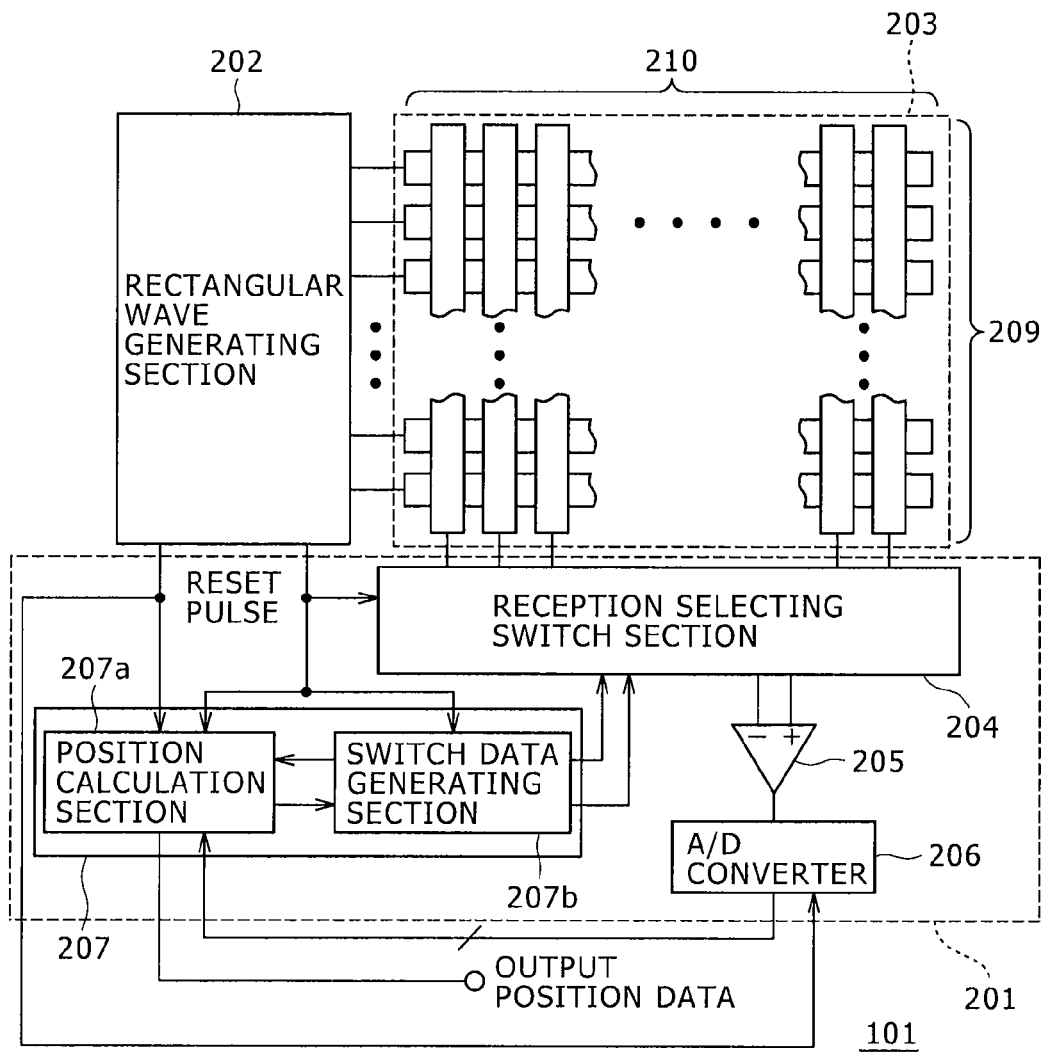
FIG. 2A is a general block diagram.

FIG. 2A is a general block diagram of the position detecting device according to the embodiment of the present invention.

The position detecting device 101 includes a rectangular wave generating section 202, a sensor substrate 203 connected to the rectangular wave generating section 202, and a signal detecting circuit 201 connected to the sensor substrate 203. The signal detecting circuit 201 includes a reception selecting switch section 204 connected to the sensor substrate 203, a differential amplifier section 205 connected to the reception selecting switch section 204, an A/D converter 206 connected to the differential amplifier section 205, and a controlling section 207 connected to the A/D converter 206.

The rectangular wave generating section 202 is a signal supplying section that generates the voltage of a one-shot pulse in the form of a rectangular wave which pulse is supplied to an X-axis electrode 209 forming the sensor substrate 203, a clock pulse, and a reset pulse. The clock pulse generated by the rectangular wave generating section 202 is supplied to a position calculating section 207a within the controlling section 207. The reset pulse generated by the rectangular wave generating section 202 is supplied to each of the A/D converter 206, the position calculating section 207a, and a switch data generating section 207b within the controlling section 207. Incidentally, the pulse width of the one-shot pulse generated by the rectangular wave generating section 202 is for example set at 2.5 μsec, which is equal to the period of a signal of half a cycle extracted from a rectangular wave of 200 kHz, which is considered to be most readily absorbed by a human body.

Figure 2B:
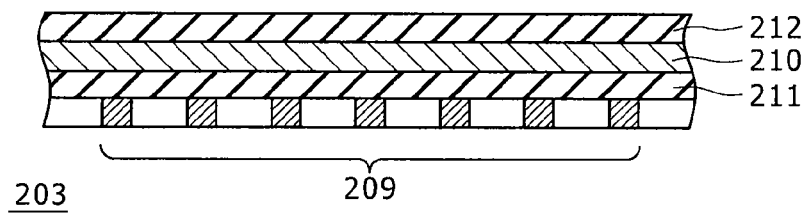
FIG. 2B is a partial cross-sectional view, of the position detecting device according to the embodiment of the present invention.

FIG. 2B is a partial cross-sectional view of the sensor substrate 203.

The sensor substrate 203 is a sensor for detecting a position on the position detecting plane 102 of the position detecting device 101, to which position the finger 104 (see FIG. 1) of a human body as an indicating object is in proximity. The sensor substrate 203 includes the X-axis electrode 209 formed by arranging m long and narrow electrodes in parallel with each other, a Y-axis electrode 210 formed by arranging n long and narrow electrodes in parallel with each other, an insulating sheet 211 for insulating the X-axis electrode 209 and the Y-axis electrode 210 from each other, and an insulating sheet 212 for protecting the X-axis electrode 209.

The X-axis electrode 209 and the Y-axis electrode 210 forming the sensor substrate 203 are formed so as to be arranged vertically and horizontally while maintaining a state of being insulated from each other via the insulating sheet 211. A capacitor is therefore formed at each of intersections of the X-axis electrode 209 and the Y-axis electrode 210. The X-axis electrode 209 is connected to the rectangular wave generating section 202. The voltage of the one-shot pulse in the form of a rectangular wave is applied from the rectangular wave generating section 202 to the X-axis electrode 209.

Electrodes of each of the X-axis electrode 209 and the Y-axis electrode 210 forming the sensor substrate 203 are arranged at appropriate intervals to detect the presence of a finger 104. In the embodiment of the present invention, the diameter of a little finger of a typical adult when the little finger is in contact with the position detecting plane, for example, is assumed to be 7 to 8 mm, and the electrodes are arranged at intervals of 3.2 mm, which are intervals of less than half the diameter.

The reception selecting switch section 204 is a switch for selectively connecting each electrode forming the Y-axis electrode 210 to one of the positive side input terminal and the negative side input terminal of the differential amplifier section 205 in a succeeding stage. The reception selecting switch section 204 is connected to the rectangular wave generating section 202 and the differential amplifier section 205. The reception selecting switch section 204 is supplied with the reset pulse output from the rectangular wave generating section 202 and a readout clock and switch data output from the switch data generating section 207b. The reception selecting switch section 204 outputs a current output from the sensor substrate 203 to the differential amplifier section 205.

The differential amplifier section 205 converts the weak current output from the sensor substrate 203 via the reception selecting switch section 204 into a voltage, amplifies the voltage, and then outputs the amplified voltage to the A/D converter 206.

The A/D converter 206 converts the analog signal input from the differential amplifier section 205 into digital data, and then outputs the digital data to the position calculating section 207a.

The controlling section 207 is a microcomputer that controls the reception selecting switch section 204 on the basis of the clock pulse input from the rectangular wave generating section 202, and which calculates a position on the input surface, which position a finger 104 has touched, and then outputs positional information. The controlling section 207 includes the position calculating section 207a and the switch data generating section 207b.

The position calculating section 207a is a functional part of the microcomputer. The position calculating section 207a performs predetermined arithmetic processing on address information and digital data to calculate positional information. The position calculating section 207a is supplied with the digital data output from the A/D converter 206, the clock pulse and the reset pulse output from the rectangular wave generating section 202, and the address information output from the switch data generating section 207b. The position calculating section 207a performs arithmetic processing on the basis of these input signals and the data to output information on presence or absence of a finger and the position of the finger when the finger is present.

The switch data generating section 207b supplies switch data as setting information to the reception selecting switch section 204. The switch data generating section 207b is supplied with the reset pulse output from the rectangular wave generating section 202 and a detected Y-axis address and a changing signal output from the position calculating section 207a. The switch data generating section 207b performs data processing on the basis of these input signals. The switch data generating section 207b then outputs the switch data and the readout clock to the reception selecting switch section 204 and outputs a first Y-axis address and a second Y-axis address to the position calculating section 207a. In this case, the first Y-axis address is an address for searching the whole of the position detecting plane 102 quickly (roughly), and the second Y-axis address is an address for searching a particular part of the position detecting plane 102 closely (finely).

[Rectangular Wave Generating Section]

Figure 3:
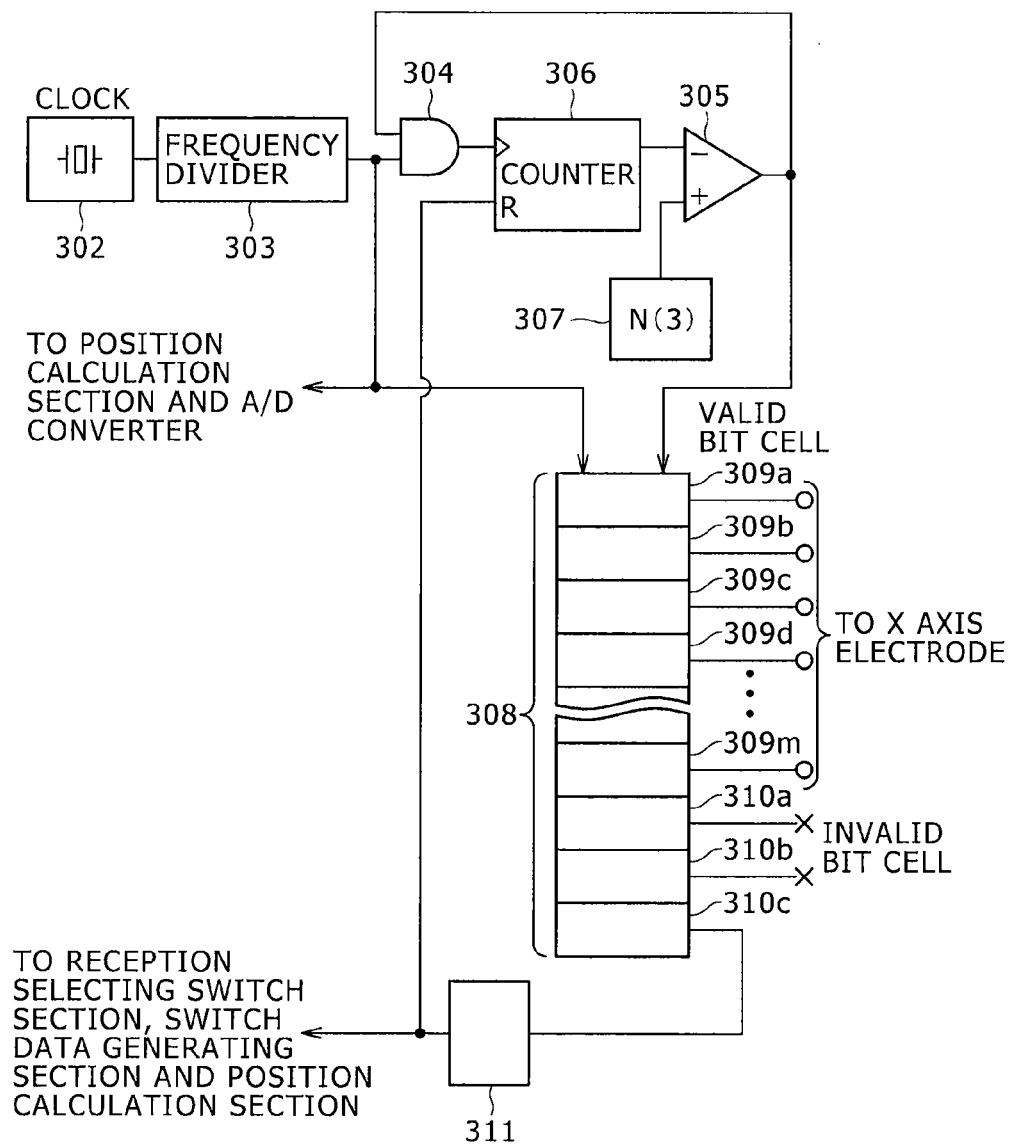
FIG. 3 is an internal block diagram of a rectangular wave generating section.

A configuration and operation of the rectangular wave generating section 202 will next be described in detail with reference to FIG. 3.

The rectangular wave generating section 202 includes a clock generator 302, a frequency divider 303, an AND gate 304, a counter 306, a digital comparator 305, a constant n 307, a shift register 308, and a monostable multivibrator 311.

The clock generator 302 is an oscillator that generates the clock of a rectangular wave of a fixed frequency. The clock generator 302 for example generates a rectangular wave of 12 MHz (one cycle is 8.33 ns). The clock of 12 MHz generated by the clock generator 302 is supplied to the frequency divider 303.

The frequency divider 303 is a well known programmable counter. The frequency divider 303 converts the frequency of the clock input from the clock generator 302 to 1/N by counting the clock to a certain number. In the present embodiment, the frequency dividing ratio of the frequency divider 303 is set at 1/10, and thus the clock is frequency-divided into 1200 kHz (one cycle is 0.833 μs).

The rectangular wave signal (hereinafter abbreviated simply as the rectangular wave) of 1200 kHz output from the frequency divider 303 is supplied as clock pulse to the AND gate 304 and also supplied to the shift register 308 and the position calculating section 207a to be described later.

The AND gate 304 is a well known gate that outputs a logical product of input digital values. The AND gate 304 supplies the clock pulse input from the frequency divider 303 to the counter 306 only when a high potential representing "true" of a logical value, that is, a value "1" is input from the digital comparator 305.

The counter 306 is a well known counter that increments an output numerical value at an up edge of an input signal. The output numerical value of the counter 306 is reset when a high potential representing "true" of a logical value is supplied to the reset terminal of the counter 306. Incidentally, "0" is set as an initial value of the counter 306. The input terminal of the counter 306 is connected to the output terminal of the AND gate 304. The reset terminal of the counter 306 is connected to the monostable multivibrator 311 to be described later.

When the clock pulse is input from the AND gate 304 to the counter 306, the counter 306 outputs a count value obtained by adding one each time an up edge of the clock pulse is input (0, 1, 2, . . . ). When a pulse signal output from the monostable multivibrator 311 to be described later is input to the reset terminal of the counter 306, the count value of the counter 306 is reset, and the counter 306 outputs "0."

The digital comparator 305 is a comparator that compares the magnitude of two input numerical values. The digital comparator 305 compares a numerical value input from a positive input with a numerical value input from a negative input. When the numerical value input from the positive input is larger, the digital comparator 305 outputs a high potential representing "true" (=1) of logic.

The constant n 307 is connected to the positive input of the digital comparator 305. The counter 306 is connected to the negative input of the digital comparator 305. Thus, comparing the count value of the counter 306, which count value is input from the negative input, with the numerical value of the constant n 307, which numerical value is input from the positive input, the digital comparator 305 outputs a value "1" when the numerical value of the constant n 307 is larger than the output value of the counter 306, and outputs "0" when the numerical value of the constant n 307 is equal to or smaller than the count value. A logical value input indicating a result of the comparison by the digital comparator 305 is input to the AND gate 304 and the shift register 308.

The constant n 307 is provided by a register or the like. A natural number multiple of 200 kHz is given as the constant n 307. In the present embodiment, n is set at "3." The constant n 307 is input to the positive input of the digital comparator 305.

The shift register 308 is a well known serial-in parallel-out shift register. The shift register 308 is formed by a cascade connection of well known D flip-flops, for example. The shift register 308 has a plurality of (m) effective bit cells 309a to 309m and three ineffective bit cells 310a, 310b, and 310c at the termination of the shift register 308. The effective bit cells 309a to 309m are connected to the respective electrodes forming the X-axis electrode 209. The X-axis electrode 209 is not connected to the ineffective bit cells 310a, 310b, and 310c.

The last ineffective bit cell 310c of the ineffective bit cells 310a, 310b, and 310c is connected to the monostable multivibrator 311.

The logical value output of the monostable multivibrator 311 is supplied to the reset terminal of the counter 306, the reception selecting switch section 204, the position calculating section 207a, and the switch data generating section 207b.

The shift register 308 stores the output value of the digital comparator 305 according to an up edge of the clock pulse output from the frequency divider 303, and shifts a value stored in each cell to an adjacent cell (for example shifts a value stored in the effective bit cell 309a to the effective bit cell 309b).

When an effective bit cell 309a to 309m of the shift register 308 is supplied with a logical value "1" from the digital comparator 305 or an immediately preceding adjacent cell and supplied with an up edge of the clock pulse, the effective bit cell outputs a high potential to an electrode of the X-axis electrode 209, which electrode of the X-axis electrode 209 is connected to the effective bit cell supplied with the logical value "1."

Similarly, when an effective bit cell 309a to 309m of the shift register 308 is supplied with a logical value "0" from the digital comparator 305 or an immediately preceding adjacent cell and supplied with an up edge of the clock pulse, the effective bit cell outputs a low potential to an electrode of the X-axis electrode 209, which electrode of the X-axis electrode 209 is connected to the effective bit cell.

When a logical value "1" is input to each effective bit cell 309a to 309m where a logical value "0" is set, the potential of the X-axis electrode 209 makes a transition from a low potential to a high potential.

Conversely, when a logical value "0" is input to each effective bit cell 309a to 309m where a logical value "1" is set, the potential of the X-axis electrode 209 makes a transition from a high potential to a low potential.

That is, the shift register 308 supplies a one-shot pulse to each electrode of the X-axis electrode 209 by changing the logical value input to each effective bit cell 309a to 309m from "0" to "1" to "0" with the passage of time.

The monostable multivibrator 311 outputs a pulse signal of a certain width using a rising edge of an input signal (signal from the ineffective bit cell 310c) as a trigger. In the present embodiment, the width of the pulse signal of the certain width is set to be within one clock of the above-described rectangular wave signal. That is, the monostable multivibrator 311 is provided to generate the reset pulse of the counter 306 from the rising edge of the signal output by the ineffective bit cell 310c.

An operation of the rectangular wave generating section 202 will be described below in detail.

Because the initial value of the counter 306 is zero, the counter 306 outputs a numerical value "0" from the output terminal of the counter 306. The digital comparator 305 compares the numerical value supplied from the constant n 307 (n=3) with the numerical value "0" input from the counter 306. At this point in time, the numerical value of the constant n 307 is larger than the value input from the counter 306. The digital comparator 305 therefore outputs a logical value "1." The AND gate 304 is supplied with the logical value "1" from the digital comparator 305 described above. The AND gate 304 therefore supplies the clock pulse output from the frequency divider 303 to the counter 306. Because the clock pulse is input from the AND gate 304 to the counter 306, the counter 306 outputs a value "1."

Thereafter, the value "1" is input to the digital comparator 305, and the AND gate 304, the counter 306, and the digital comparator 305 repeat the above-described operation until the value input from the counter 306 to the digital comparator 305 becomes "3."

When the value input from the counter 306 to the digital comparator 305 reaches three, the value input from the negative input ("3") and the numerical value "3" of the constant n 307, which numerical value is input from the positive input, are the same. The digital comparator 305 therefore outputs "false," that is, a value "0." As a result, the AND gate 304 stops supplying the clock pulse to the counter 306. Thus counting in the counter 306 is stopped by the AND gate 304. Thereafter, the supply of the clock to the counter 306 is stopped by the AND gate 304, and the counter 306 consequently stops counting. That is, when the above-described operation is performed, logical values are output in order of "111000 . . . " from the digital comparator 305 in respective timing of the clock pulse.

An operation of the shift register 308 will next be described.

A logical value output from the digital comparator 305 is supplied to the effective bit cell 309a of the shift register 308. In response to an up edge of the clock pulse supplied from the frequency divider 303, the shift register 308 shifts the value "1" retained in the effective bit cell 309a to the adjacent effective bit cell 309b, and stores a value "1" newly output from the digital comparator 305 in the effective bit cell 309a. Thereafter, each time the clock pulse is input, the shift register 308 shifts the value of a specific effective bit cell 309x to an adjacent effective bit cell 309(x+1) in order. Then, a value retained in the last effective bit cell 309m is supplied to the first ineffective bit cell 310a. Similarly, a value retained in the first ineffective bit cell 310a is supplied to the adjacent ineffective bit cell 310b, and a value retained in the ineffective bit cell 310b is supplied to the last ineffective bit cell 310c.

The value retained in the last ineffective bit cell 310c is supplied to the monostable multivibrator 311 when the clock pulse is input to the shift register 308.

When the shift register 308 thus continues moving data, a value "111" input in a first stage reaches the ineffective bit cells 310a to 310c.

When a logical value "1" is sent to the last ineffective bit cell 310c, the output terminal of the cell 310c changes from a low potential to a high potential. Receiving this voltage change, that is, an up edge, the monostable multivibrator 311 generates a reset pulse. The reset pulse is input to the reset terminal of the counter 306, so that the counter 306 is reset.

When a next value "1" is thereafter input to the monostable multivibrator 311, the monostable multivibrator 311 does not supply the pulse signal to the reset input of the counter 306. The counter 306 therefore resumes counting at this point in time.

The rectangular wave generating section 202 thus supplies a one-shot pulse to the X-axis electrode 209.

A configuration and a position detecting operation of the position calculating section 207a will next be described in detail with reference to FIG. 4.

The position calculating section 207a includes an integrating section 402, a buffer memory 403, a peak detecting section 404, a center of gravity calculating section 405, and an X-axis address counter 406.

The integrating section 402 is an integrator for integrating a digital value obtained from the A/D converter 206. The integrating section 402 includes for example a memory and an adder not shown in the figure. The integrating section 402 is connected to the rectangular wave generating section 202, the A/D converter 206, and the buffer memory 403. Each time the clock pulse output from the rectangular wave generating section 202 is input to the integrating section 402, the integrating section 402 adds together the digital value input from the A/D converter 206 and a value stored in the memory and stores a resulting addition value, and outputs the addition value.

The buffer memory 403 is a RAM for temporarily storing the output value of the integrating section 402. The buffer memory 403 is connected to the rectangular wave generating section 202, the integrating section 402, the peak detecting section 404, and the center of gravity calculating section 405. The buffer memory 403 stores the addition value output from the integrating section 402 as detection data. The buffer memory 403 is supplied with the clock pulse output from the rectangular wave generating section 202 and X-axis address information output from the X-axis address counter 406 to be described later. The buffer memory 403 stores the detection data together with the X-axis address information according to timing in which the clock pulse is input to the buffer memory 403.

The peak detecting section 404 is to compare the detection data stored in the buffer memory 403, and detect detection data having a largest value as a peak value from the detection data. The peak detecting section 404 is connected to the buffer memory 403 and the center of gravity calculating section 405. The peak value detected in the peak detecting section 404 is output to the center of gravity calculating section 405 and a region determining section 407 in the following stage.

The center of gravity calculating section 405 is to calculate coordinates of a center of gravity from obtained data. The center of gravity calculating section 405 is connected to the buffer memory 403, the peak detecting section 404, the X-axis address counter 406, the region determining section 407, and the switch data generating section 207b. The center of gravity calculating section 405 is supplied with a second Y-axis address output from the switch data generating section 207b, the clock pulse output from the rectangular wave generating section 202, and an X-axis address output from the X-axis address counter 406 to be described later.

On the basis of an address in the buffer memory 403, which address indicates the peak value input from the peak detecting section 404, and the second Y-axis address input from the switch data generating section 207b, the center of gravity calculating section 405 obtains at least data stored at the address in the buffer memory 403, which address indicates the peak value, and addresses preceding and succeeding the address indicating the peak value from the buffer memory 403. The center of gravity calculating section 405 then calculates the center of gravity of the three pieces of data.

The position of the center of gravity as a result of the calculation of the center of gravity calculating section 405 is the position of a finger on the sensor substrate 203, that is, positional data.

The X-axis address counter 406 is to count the clock pulse output from the rectangular wave generating section 202. The count value of the X-axis address counter 406 is reset by the reset pulse output from the rectangular wave generating section 202. The output value (counting result) of the X-axis address counter 406 is a value selecting one of the electrodes forming the X-axis electrode 209.

The output value of the X-axis address counter 406 is supplied as an X-axis address to the buffer memory 403 and the center of gravity calculating section 405.

The region determining section 407 determines from obtained data whether a finger is present on the position detecting plane 102 of the position detecting device 101 and, when a finger is present, determines a position (region) where the finger is present. The region determining section 407 is connected to the peak detecting section 404 and the switch data generating section. The region determining section 407 is supplied with a first Y-axis address output from the switch data generating section 207b.

When detecting the presence of a finger, the region determining section 407 outputs a switching signal and the first Y-axis address, which is the Y-coordinate of the finger, as a detected Y-axis address to the switch data generating section 207b.

The position detecting device 101 according to the present embodiment searches for the position of a finger present on the sensor substrate 203 in two modes.

One is a rough search mode in which the presence of a finger is detected with the sensor substrate 203 divided into broad regions. The other is a fine search mode in which the position of a finger is finely detected in a region where the finger is found to be present on the sensor substrate 203.

The region determining section 407 operates when the position detecting device 101 is in the rough search mode. The region determining section 407 determines the presence or absence of a finger and a region where the finger is present. When determining the presence of a finger and the region of the finger, the region determining section 407 outputs a switching signal indicating that the presence of a finger and the region of the finger are determined to the switch data generating section 207b.

The center of gravity calculating section 405 operates when the position detecting device 101 is in the fine search mode. The center of gravity calculating section 405 calculates the position where the finger is present within the region where the finger is present, which region is detected by the region determining section 407, by center of gravity calculation.

When the finger moves away from the position detecting plane of the position detecting device 101, the center of gravity calculating section 405 outputs a signal to the effect that the finger is not present on the position detecting plane to the region determining section 407. When supplied with the signal to the effect that the finger is not present on the position detecting plane, the region determining section 407 inverts the switching signal, and executes the rough search mode.

Principles of operation of the rectangular wave generating section 202 will next be described with reference to FIG. 5 and FIGS. 6A to 6G. Incidentally, for simplicity of description, a signal will be illustrated, which signal is output from a first Y-axis electrode 506a, which is an arbitrary electrode of the Y-axis electrode 210, when a rectangular wave is supplied to a first X-axis electrode 502 and a second X-axis electrode 503 as arbitrary electrodes forming the X-axis electrode 209.

Figure 4:
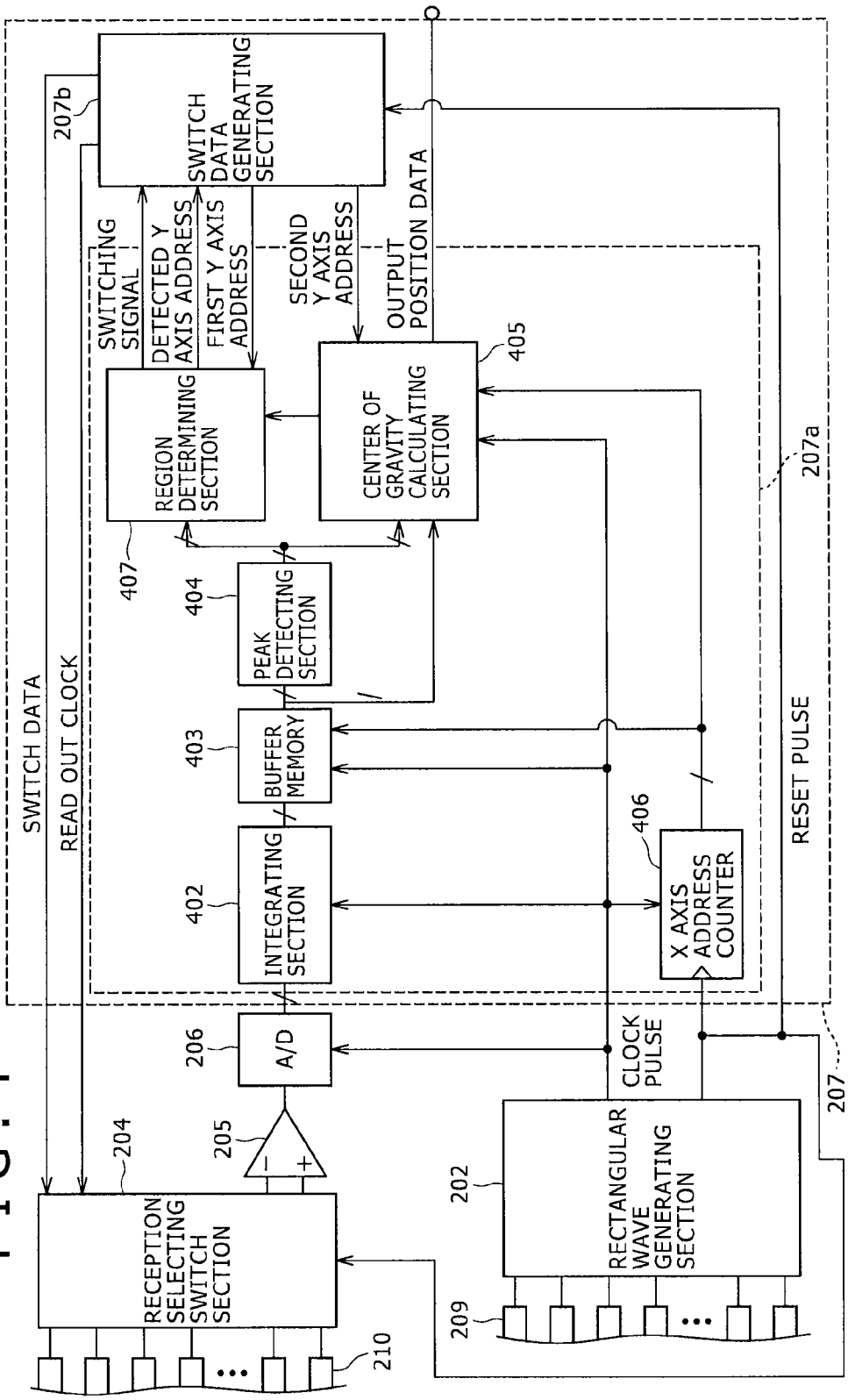
FIG. 4 is an internal block diagram of a position calculating section.
Figure 5:
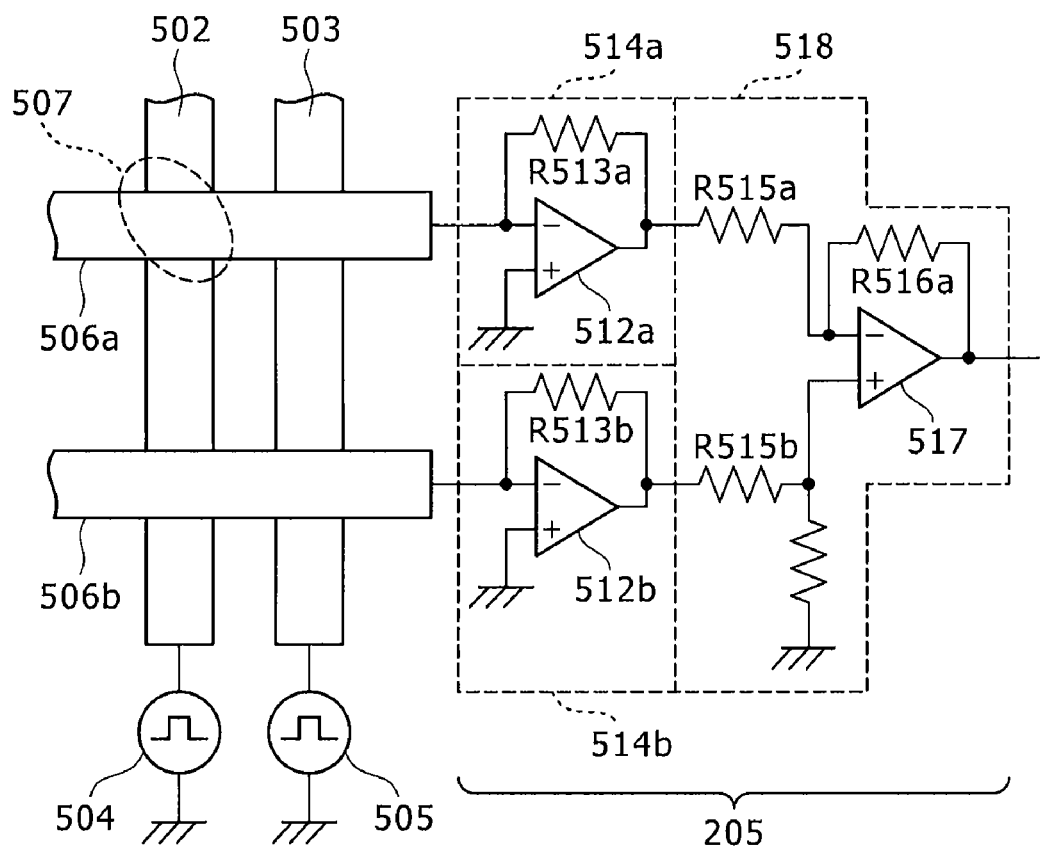
FIG. 5 shows an equivalent circuit of the position detecting device according to the present embodiment.

Directing attention to the first X-axis electrode 502, the second X-axis electrode 503, and the first Y-axis electrode 506a, the rectangular wave generating section 202, the X-axis electrode 209, the Y-axis electrode 210, and the differential amplifier section 205 shown in FIG. 4 can be represented by an equivalent circuit shown in FIG. 5. Specifically, the rectangular wave generating section 202 supplying a rectangular wave to the first X-axis electrode 502 and the second X-axis electrode 503 supplies the rectangular wave to each of the first X-axis electrode 502 and the second X-axis electrode 503, and can therefore be considered to be a first rectangular wave voltage source 504 and a second rectangular wave voltage source 505.

Incidentally, the presence of a finger 507 is indicated by a dotted line in FIG. 5.

The differential amplifier section 205 shown in FIG. 4 includes a current-to-voltage converting circuit 514a composed of an operational amplifier 512a connected to the first Y-axis electrode 506a and a resistor R513a, a current-to-voltage converting circuit 514b composed of an operational amplifier 512b connected to a second Y-axis electrode 506b and a resistor R513b, and a differential amplifier 518 composed of a resistor R515a connected to the current-to-voltage converting circuit 514a, a resistor R515b connected to the current-to-voltage converting circuit 514b, a resistor R516, and an operational amplifier 517.

Input terminals of the operational amplifier 512a forming the current-to-voltage converting circuit 514a maintain a virtually short-circuited state due to a well known virtual short phenomenon. Thus, as viewed from the first Y-axis electrode 506a, the input terminals of the operational amplifier 512a are in a state equivalent to that of being grounded. Incidentally, the current-to-voltage converting circuit 514b is similar to the current-to-voltage converting circuit 514a.

The current-to-voltage converting circuits 514a and 514b convert a weak current into a voltage, and amplify the voltage. The amplified voltage signal is then input to the differential amplifier 518 to be amplified to a signal level that is easier for a circuit in the following stage to handle. Incidentally, the differential amplifier 518 has an effect of cancelling out noises mixed into the first Y-axis electrode 506a and the second Y-axis electrode 506b in phase with each other.

Description will next be made of differences between current waveforms appearing in the first Y-axis electrode 506a when the finger 507 is in proximity to an intersection of the electrodes and when the finger 507 is not in proximity to the intersection.

When a rectangular wave voltage is applied to a capacitor, a current flows through the capacitor only at times of a rising edge and a falling edge of the rectangular wave voltage. Because a capacitor is formed at the intersection of the first X-axis electrode 502 and the first Y-axis electrode 506a, a similar phenomenon occurs in the capacitor formed at the intersection.

Figure 6A:
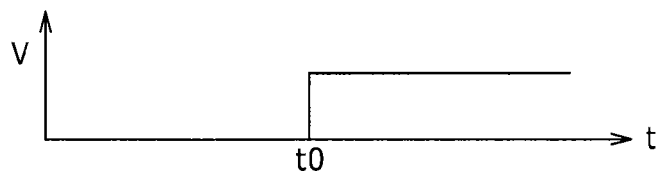
FIGS. 6A to 6G are waveform charts of the position detecting device according to the present embodiment.

Thus, when a rectangular wave signal rising at time t0 is applied to an X-axis electrode, and when the finger 507 is not in proximity to an intersection of the electrode, that is, when the second rectangular wave voltage source 505 applies a rectangular wave shown in FIG. 6A to the second X-axis electrode 503, a current flows through a capacitor formed between the second X-axis electrode 503 and the first Y-axis electrode 506a only at the time of a rising edge of the applied rectangular wave signal. As a result, the current flowing through the capacitor has a waveform shown in FIG. 6B.

Figure 6B:
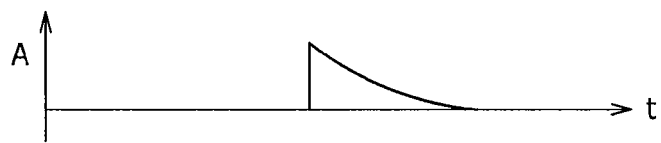
Figure 6C:
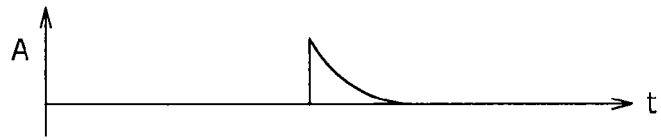

On the other hand, when the finger 507 is in proximity to an intersection of electrodes, that is, when the first rectangular wave voltage source 504 applies the rectangular wave signal shown in FIG. 6A to the first X-axis electrode 502, a part of electric lines of force produced from the first X-axis electrode 502 are absorbed by the finger 507. As a result, the capacitance of a capacitor formed at the intersection of the electrodes in the case of the finger 507 being in proximity to the intersection (FIG. 6C) is decreased as compared with the case of the finger 507 not being in proximity to the intersection of the electrodes (FIG. 6B). The total area of a current waveform in FIG. 6C is therefore smaller than that of FIG. 6B. Incidentally, as is well known, the total area of the current waveform corresponds to a charge stored in the capacitor.

Figure 6D:
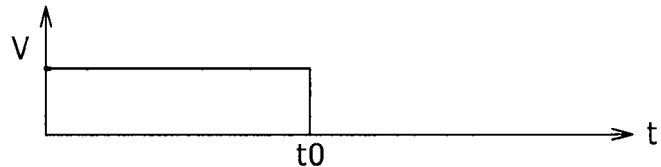
Figure 6E:
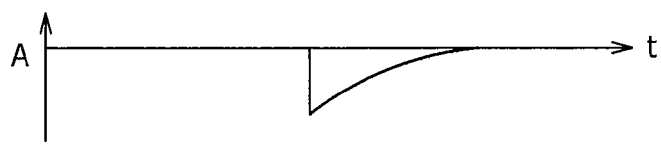

In addition, when a rectangular wave signal falling at time t0 is applied to an X-axis electrode, and when the finger 507 is not in proximity to an intersection of the electrode, that is, when the second rectangular wave voltage source 505 applies a rectangular wave shown in FIG. 6D to the second X-axis electrode 503, a current flows through the capacitor formed between the second X-axis electrode 503 and the first Y-axis electrode 506a only at the time of a falling edge of the applied rectangular wave signal. As a result, the current flowing through the capacitor has a waveform shown in FIG. 6E.

Description will next be made of a case where rectangular wave signals are simultaneously applied to both of the first X-axis electrode 502 and the second X-axis electrode 503 at the point of time t0.

In the case of the finger 507 not being in proximity to the intersection of the first X-axis electrode 502 and the first Y-axis electrode 506a, a comparison between the current waveform (FIG. 6B) when the rectangular wave signal rising at time t0 (FIG. 6A) is applied to the first X-axis electrode 502 and the current waveform (FIG. 6E) when the rectangular wave signal falling at time t0 (FIG. 6D) is applied to the first X-axis electrode 502 shows that the two current waveforms are in axisymmetric relation to each other with respect to a time axis t. Accordingly, when the voltage shown in FIG. 6A is applied to one of adjacent X-axis electrodes (for example the first X-axis electrode 502 and the second X-axis electrode 503), and the voltage shown in FIG. 6D is simultaneously applied to the other X-axis electrode, the current shown in FIG. 6B and the current shown in FIG. 6E simultaneously flow through the second Y-axis electrode 506*b*.

Figure 6F:
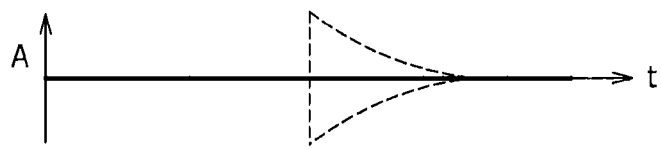

That is, supposing that the first rectangular wave voltage source 504 applies the rising voltage (FIG. 6A) to the first X-axis electrode 502 and the second rectangular wave voltage source 505 applies the falling voltage (FIG. 6D) to the second X-axis electrode 503 at time t0 in the case of the finger 507 not being in proximity to the intersection of the first X-axis electrode 502 and the first Y-axis electrode 506*a*, the capacitance of the capacitor formed by the intersection of the first X-axis electrode 502 and the first Y-axis electrode 506*a* is equal to the capacitance of the capacitor formed by the intersection of the second X-axis electrode 503 and the first Y-axis electrode 506*a*. The currents generated at the respective intersections therefore cancel each other out. As a result, no current waveform occurs in the first Y-axis electrode 506*a* (FIG. 6F).

On the other hand, in the case of the finger 507 being in proximity to the intersection of the first X-axis electrode 502 and the first Y-axis electrode 506*a*, a comparison between the current waveform (FIG. 6C) when the rectangular wave signal rising at time t0 (FIG. 6A) is applied to the first X-axis electrode 502 and the current waveform (FIG. 6E) when the rectangular wave signal falling at time t0 (FIG. 6D) is applied to the first X-axis electrode 502 shows that the two current waveforms are not in axisymmetric relation to each other with respect to the time axis t. Accordingly, when the voltage shown in FIG. 6A is applied to one of adjacent X-axis electrodes (for example the first X-axis electrode 502 and the second X-axis electrode 503), and the voltage shown in FIG. 6D is simultaneously applied to the other X-axis electrode, the current shown in FIG. 6C and the current shown in FIG. 6E simultaneously flow through the first Y-axis electrode 506*a*.

Figure 6G:
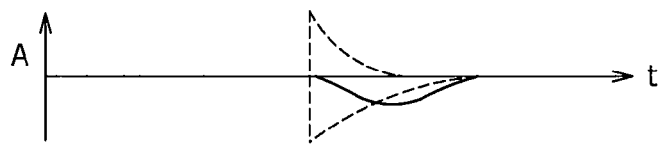

That is, supposing that the first rectangular wave voltage source 504 applies the rising voltage (FIG. 6A) to the first X-axis electrode 502 and the second rectangular wave voltage source 505 applies the falling voltage (FIG. 6D) to the second X-axis electrode 503 at time t0 in the case of the finger 507 being in proximity to the intersection of the first X-axis electrode 502 and the first Y-axis electrode 506*a*, the capacitance of the capacitor formed by the intersection of the first X-axis electrode 502 and the first Y-axis electrode 506*a* is lower than the capacitance of the capacitor formed by the intersection of the second X-axis electrode 503 and the first Y-axis electrode 506*a*. As a result, a current waveform occurs in a negative direction in the first Y-axis electrode 506*a* (FIG. 6G).

As described above, when the finger 507 is brought into proximity to an intersection of the X-axis electrode and the Y-axis electrode, the capacitance of a capacitor formed at the intersection is decreased. A composite current waveform of a current generated by applying a rising or falling voltage change to the intersection, where the capacitance is decreased, and a current generated by a voltage change appearing at another intersection appears in the Y-axis electrode.

On the other hand, as shown in FIG. 5, the finger 507 is not in proximity to the second Y-axis electrode 506*b*. Therefore no current occurs in the second Y-axis electrode 506*b*.

A signal obtained by converting the current waveform of the first Y-axis electrode 506*a* into a voltage and a signal obtained by converting the current waveform of the second Y-axis electrode 506*b* into a voltage are input to the differential amplifier 518 in opposite phase with each other to be subjected to differential amplification. Thus, when the finger 507 is in proximity to the intersection of the first X-axis electrode 502 and the first Y-axis electrode 506*a*, a voltage signal having the same waveform as the current waveform occurring in the first Y-axis electrode 506*a* is output from the differential amplifier 518.

An operation of detecting a finger will next be described with reference to FIGS. 3 and 4 and FIGS. 7A to 7J. Incidentally, in FIGS. 7A to 7J, attention is directed to the waveform of a signal obtained from the current/voltage converting circuit 514*a* in FIG. 5 for the convenience of description.

FIG. 7A is a partial cross-sectional view of the sensor substrate 203 of FIG. 2A, similar to FIG. 2B.

FIGS. 7B, 7C, 7D, 7E, 7F, 7G, and 7H are waveform charts showing timing of applying a voltage to arbitrary X-axis electrodes 702*a* to 702*g* of the X-axis electrode 209 shown in FIG. 7A. In this case, times t1 to t7 in FIGS. 7B to 7H represent times at which a one-shot pulse is applied to the respective X-axis electrodes 702*a* to 702*g*. Time t2 represents a time one clock after time t1. Similarly, each time tn represents a time one clock after t(n−1).

When a value "1" is input to the effective bit cell 309*a* of the shift register 308, the rectangular wave generating section 202 applies a voltage to the X-axis electrode 702*a* connected to the effective bit cell 309*a*. The rectangular wave generating section 202 then continues applying the voltage to the X-axis electrode 702*a* while the value "1" is input to the effective bit cell 309*a*. Thereafter, when a value "0" is input to the effective bit cell 309*a*, the rectangular wave generating section 202 ends the application of the voltage to the X-axis electrode 702*a*. In this case, the time during which the shift register 308 applies the voltage to the X-axis electrode 702*a* corresponds to three clocks input to the shift register 308 because a clock frequency-divided and output by the frequency divider 303 is used and the value "1" is input to the shift register 308 three consecutive times. Consequently, when time t1 at which the one-shot pulse is applied to the X-axis electrode 702*a* is set as a reference, for example, a falling edge of the one-shot pulse applied to the X-axis electrode 702*a* arrives at time t4.

Thus, the rectangular wave generating section 202 sequentially applies the one-shot pulse to the X-axis electrodes 702*a* to 702*g* connected to the shift register 308 of the rectangular wave generating section 202. Currents generated by a combination of one-shot pulses whose rising edge time and falling edge time are the same among the one-shot pulses applied to the respective X-axis electrodes 702*a* to 702*g* are cancelled out. Therefore no current waveform occurs in a Y-axis electrode 703. For example, a case of synthesizing a current occurring in the Y-axis electrode 703 at the falling edge time of the one-shot pulse applied to the X-axis electrode 702*c* and a current occurring in the Y-axis electrode 703 at the rising edge time of the one-shot pulse applied to the X-axis electrode 702*f* corresponds to the above case.

Similarly, no current occurs in the Y-axis electrode 703 when there are one-shot pulses rising and falling at the same time (for example time t6). No current waveform similarly occurs also when the one-shot pulse is applied to all of the X-axis electrodes of the X-axis electrode 209.

However, because the finger 507 is in proximity to an intersection of the X-axis electrode 702*d* and the Y-axis electrode 703 as shown in FIG. 7A, a synthesis of respective currents generated in the Y-axis electrode 703 by the one-shot pulses applied to the X-axis electrodes 702*d*, 702*a*, and 702*g*, respectively, does not result in zero. As a result, as shown in FIG. 7I, a current waveform appears in the Y-axis electrode 703 at each of time t4 and time t7. At time t4, the falling edge of the one-shot pulse applied to the X-axis electrode 702*a* appears simultaneously with the rising edge of the one-shot pulse applied to the X-axis electrode 702*d* to which the finger 507 is in proximity. At time t7, the rising edge of the one-shot pulse applied to the X-axis electrode 702g appears simultaneously with the falling edge of the one-shot pulse applied to the X-axis electrode 702d.

FIG. 7J shows a waveform obtained by integrating the current waveform appearing in the Y-axis electrode 703. The waveform is a virtual analog representation of output data of the integrating section 402 within the position calculating section 207a.

As shown in FIG. 7I, the current waveform appearing in the Y-axis electrode 703 is a sinusoidal alternating-current waveform that is substantially symmetric with a zero potential as a center. Accordingly, when this current waveform is integrated as it is, a waveform having a peak in a negative direction is obtained, as shown in FIG. 7J. The peak detecting section 404 captures the value of a sample clock closest to the peak of the waveform. The center of gravity calculating section 405 then calculates a center of gravity on the basis of three values, that is, the value obtained by the peak detecting section 404 and values preceding and succeeding the value obtained by the peak detecting section 404.

The center of gravity calculating section 405 receives X-axis direction address data from the X-axis address counter 406 and Y-axis direction address data from the switch data generating section 207b in order to identify the position of the peak in the X-axis direction and the Y-axis direction of the sensor substrate 203. The center of gravity calculating section 405 then calculates a true peak value and the position of the peak on a time axis on the basis of these pieces of address data and a result of the center of gravity calculation. The center of gravity calculating section 405 outputs a result of the calculation as positional data indicating the position of the finger in proximity to the sensor substrate 203.

A configuration and an operation of the reception selecting switch section 204 will next be described with reference to FIG. 8. The reception selecting switch section 204 includes a shift register 802, a register 803, a NOT gate 804, and a selector switch 805.

The shift register 802 is a serial-in parallel-out shift register. The shift register 802 has a plurality of cells 802a to 802n. The shift register 802 is supplied with a readout clock and switch data output from the switch data generating section 207b to be described later.

The shift register 802 sequentially inputs the switch data input from the switch data generating section 207b to the plurality of cells 802a to 802n according to the timing of the readout clock input from the switch data generating section 207b. Respective output terminals of the plurality of cells 802a to 802n are connected to respective cells 803a to 803n of the register 803.

The register 803 includes the plurality of cells 803a to 803n in an equal number to that of the plurality of cells forming the shift register 802. These cells 803a to 803n are for example a well known latch R-S type flip-flop. Values output from the respective cells 802a to 802n of the shift register 802 are input to the respective cells 803a to 803n of the register 803.

The NOT gate 804 is to generate a strobe signal to be supplied to the register 803. The NOT gate 804 generates the strobe signal by inverting the reset pulse input from the rectangular wave generating section 202. By being supplied with this strobe signal, the register 803 updates logical values retained in the respective cells 803a to 803n to the values of the respective cells 802a to 802n of the shift register 802 connected to the cells 803a to 803n in timing in which the reset pulse is input to the shift register 802, that is, in timing in which the strobe signal is input. Further, the cells 803a to 803n of the register 803 are connected to respective switches 805a to 805n of the selector switch 805. The selector switch 805 includes for example a plurality of analog electronic switches 805a to 805n in an equal number to that of the cells of the shift register 802 and the register 803. The selector switch 805 selectively connects each electrode of the Y-axis electrode 210 to the positive side input terminal or the negative side input terminal of the differential amplifier section 205 on the basis of the values retained by the register 803.

Figure 9:
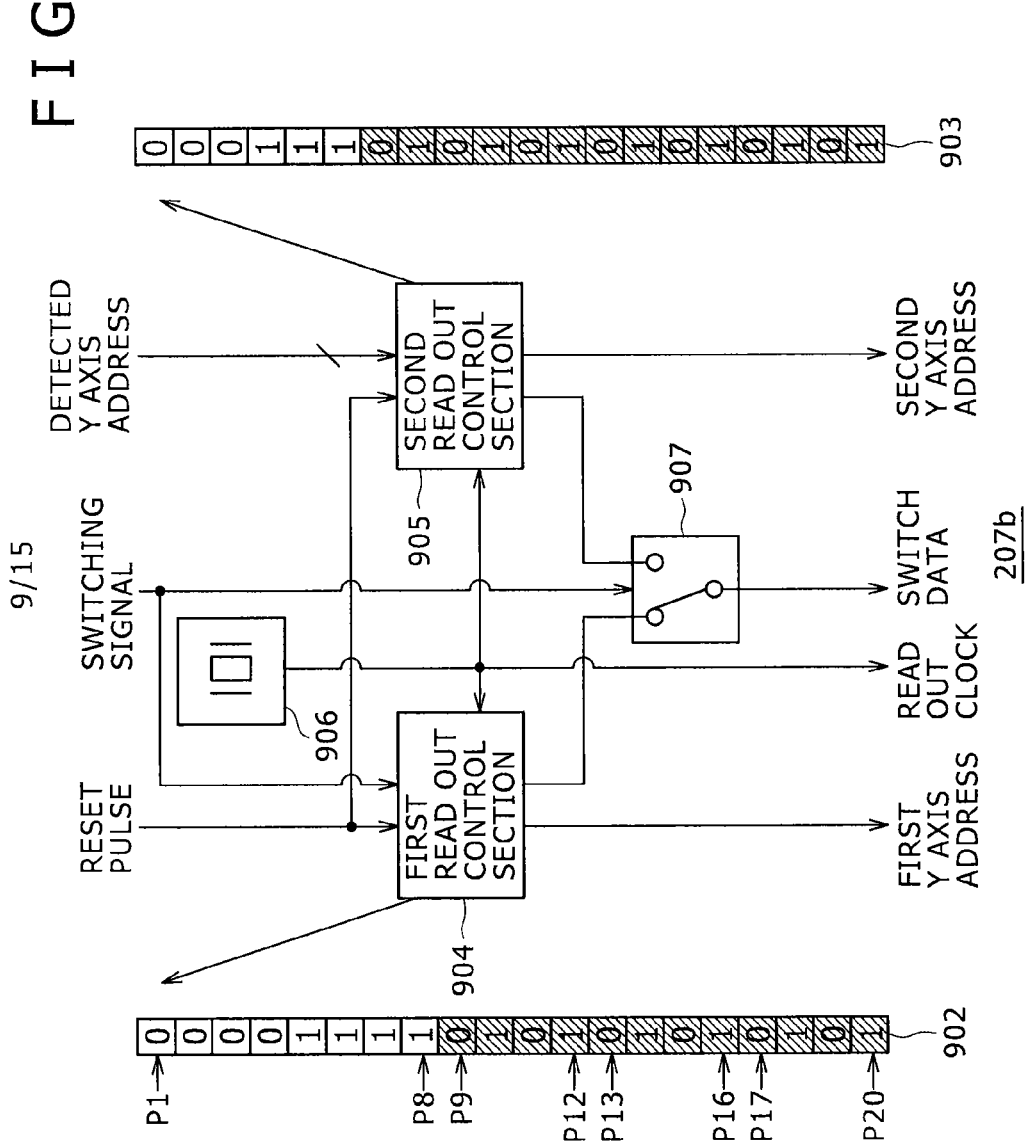
FIG. 9 is a functional block diagram of a switch data generating section.

FIG. 9 is a functional block diagram of the switch data generating section 207b.

The switch data generating section 207b implemented by a microcomputer program includes two kinds of data, which are rough search data 902 and fine search data 903, a first readout controlling section 904 for reading out the rough search data 902, a second readout controlling section 905 for reading out the fine search data 903, a readout clock generating section 906 for supplying a clock to the first readout controlling section 904 and the second readout controlling section 905, and a selector switch 907 for selectively outputting switch data output by the first readout controlling section 904 and the second readout controlling section 905.

Incidentally, description with reference to FIG. 9 and subsequent figures will be made supposing that the Y-axis electrode 210 includes 20 electrodes.

The first readout controlling section 904 reads out the rough search data 902 stored in a ROM or a RAM not shown in the figure according to the timing of the clock generated by the readout clock generating section 906 on the basis of the switching signal output by the region determining section 407 and the reset pulse output by the rectangular wave generating section 202.

The rough search data 902 is switch data for controlling the connection of each electrode of the Y-axis electrode 210 to one of the input terminals of the differential amplifier section 205. Each bit of the rough search data 902 is data to be input to the shift register 802. That is, the number of bits of the rough search data 902 is equal to the number of electrodes of the Y-axis electrode 210. In FIG. 9, the rough search data 902 is formed by 20 bits.

The second readout controlling section 905 reads out the fine search data 903 stored in a ROM not shown in the figure according to the timing of the readout clock generated by the readout clock generating section 906 on the basis of the detected Y-axis address output by the region determining section 407 and the reset pulse output by the rectangular wave generating section 202.

As with the rough search data 902, the fine search data 903 is switch data for controlling the connection of each electrode of the Y-axis electrode 210 to one of the input terminals of the differential amplifier section 205. That is, the number of bits of the fine search data 903 is equal to the number of electrodes of the Y-axis electrode 210. In FIG. 9, the fine search data 903 is also formed by 20 bits.

The readout clock generating section 906 supplies the clock for the timing of reading out the rough search data 902 to the first readout controlling section 904. This readout clock is also the clock for the timing of reading out the fine search data 903, which clock is supplied to the second readout controlling section 905.

Figure 8:
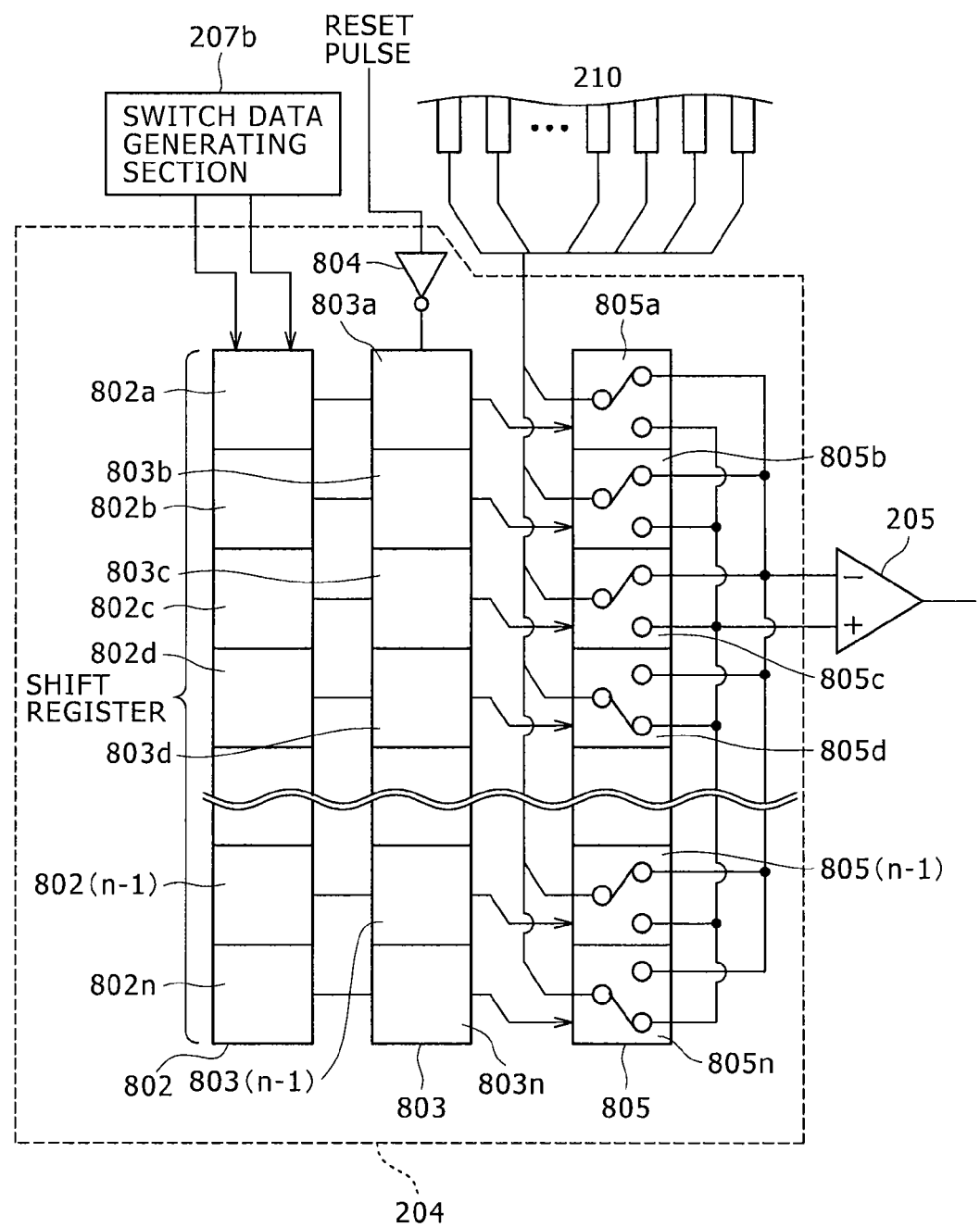
FIG. 8 is a block diagram of a reception selecting switch section.

Further, the readout clock is also the clock when switch data is written to the shift register 802 within the reception selecting switch section 204 in FIG. 8.

As described above, the rough search data 902 and the fine search data 903 have an equal number of bits to the number of electrodes of the Y-axis electrode 210. In the present embodiment, because the Y-axis electrode 210 has 20 electrodes, the rough search data 902 and the fine search data 903 are each 20 bits.

The first readout controlling section 904 converts a readout start position of the rough search data 902 by a certain rule. The first readout controlling section 904 outputs the converted value as a first Y-axis address to the region determining section 407.

The second readout controlling section 905 converts a readout start position of the fine search data 903 by a certain rule. The second readout controlling section 905 outputs the converted value as a second Y-axis address to the center of gravity calculating section 405.

The switch data output by the first readout controlling section 904 and the switch data output by the second readout controlling section 905 are selectively output to the reception selecting switch section 204 by the selector switch 907.

Further, the readout clock is output to the reception selecting switch section 204.

Figure 10:
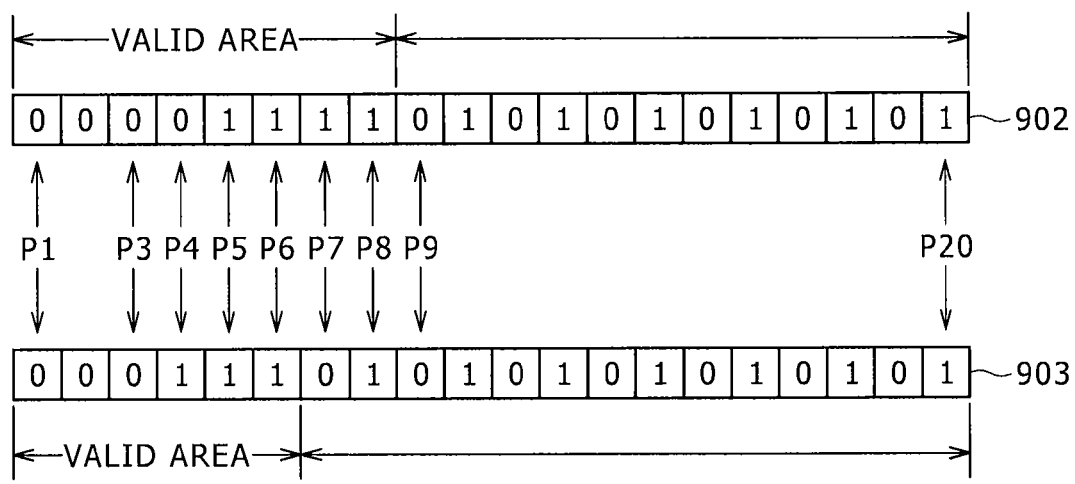
FIG. 10 is a schematic diagram explaining contents of rough search data and fine search data.

FIG. 10 is a schematic diagram explaining contents of the rough search data 902 and the fine search data 903.

In FIG. 10, the bits forming the rough search data 902 and the fine search data 903 are arranged, and a symbol is set to each bit.

The rough search data 902 is formed as follows.

First, the values of four bits from a bit position P1 to a bit position P4 are "0." Next, the values of four bits from a bit position P5 to a bit position P8 are "1." The values of 12 bits from a bit position P9 to a bit position P20 are a pattern that repeats "0" and "1" alternately and consecutively.

The fine search data 903 is formed as follows.

First, the values of three bits from a bit position P1 to a bit position P3 are "0." Next, the values of three bits from a bit position P4 to a bit position P6 are "1." The values of 14 bits from a bit position P7 to a bit position P20 are a pattern that repeats "0" and "1" alternately and consecutively.

Each of the rough search data 902 and the fine search data 903 has a plurality of consecutive bits having the value "0," followed by a plurality of consecutive bits having the value "1," and followed by a plurality of combinations of bits having the values "0" and "1."

The pattern of the rough search data 902, which pattern has a plurality of consecutive bits having the value "0" followed by a plurality of consecutive bits having the value "1," has values arranged as "00001111."

The pattern of the fine search data 903, which pattern has a plurality of consecutive bits having the value "0" followed by a plurality of consecutive bits having the value "1," has values arranged as "000111."

On the other hand, the pattern of the rough search data 902, in which pattern a combination of bits having the values "0" and "1" is repeated a plurality of times consecutively, has values arranged as "010101010101."

Similarly, the pattern of the fine search data 903, in which pattern a combination of bits having the values "0" and "1" is repeated a plurality of times consecutively, has values arranged as "01010101010101."

The pattern in which the combination of bits having the values "0" and "1" is repeated a plurality of times consecutively connects corresponding electrodes of the Y-axis electrode 210 to the positive side input terminal and the negative side input terminal of the differential amplifier section 205 alternately. Thus, when a finger is brought closer to this region, a change in current obtained by a capacitance decreased due to the presence of the finger appears in both of the positive side input terminal and the negative side input terminal of the differential amplifier section 205 in opposite phase. Thus, the current change is cancelled, and the presence of the finger cannot be detected.

That is, the switch data of the pattern in which the combination of bits having the values "0" and "1" is repeated a plurality of times consecutively forms an "insensitive region" that does not detect the presence of a finger. Conversely, the switch data of the pattern having a plurality of consecutive bits having the value "0" followed by a plurality of consecutive bits having the value "1" forms an "effective region" that detects the presence of a finger.

The insensitive region that does not detect the presence of a finger is not shown in Patent Document 1. When there is no insensitive region, and when there is only one finger in proximity to the position detecting plane, this detecting system is effective. However, when there may be a plurality of fingers, fine detection cannot be performed unless the position detecting plane is divided into parts that detect the presence of fingers and parts that do not detect the presence of fingers when the position detecting plane is scanned.

As a method for providing an insensitive region to the Y-axis electrode 210, a method is conceivable in which electrodes are not connected to the differential amplifier section 205, as shown in Patent Document 2. In this case, however, the selector switch 805 in FIG. 8 needs to be of a three-state type. In addition, because of this, the shift register 802 and the register 803 need another bit for creating a disconnected state. This increases circuit scale.

FIGS. 11A, 11B, 11C, 11D, 11E, 11F, 11G, 11H, 11I, 11J, 11K, 11L, 11M, 11N, 11O, 11P, 11Q, 11R, and 11S are diagrams showing the switch data generated and output by the switch data generating section 207b.

FIGS. 11A, 11B, 11C, and 11D show transitions of the switch data output when the switch data generating section 207b is in the rough search mode. The "− (minus)" sign of the switch data means that the value of the rough search data 902 corresponds to a bit "0" and that the selector switch 805 is controlled so as to connect the corresponding electrode of the Y-axis electrode 210 to the negative side input terminal of the differential amplifier section 205. The "+ (plus)" sign of the switch data means that the value of the rough search data 902 corresponds to a bit "1" and that the selector switch 805 is controlled so as to connect the corresponding electrode of the Y-axis electrode 210 to the positive side input terminal of the differential amplifier section 205.

Reading "0" for the "− (minus)" sign of the switch data in FIG. 11A and "1" for the "+ (plus)" sign of the switch data in FIG. 11A, the switch data in FIG. 11A is the same as the rough search data 902 in FIG. 9. That is, FIG. 11A shows that each electrode of the Y-axis electrode 210 is connected to the positive side input terminal or the negative side input terminal of the differential amplifier section 205 in the state of FIG. 11A, and shows a result of the first readout controlling section 904 reading out the rough search data 902 in FIG. 9 in order from a readout position P20 to a readout position P1 and writing the rough search data 902 in the shift register 802.

FIG. 11B shows that each electrode of the Y-axis electrode 210 is connected to the positive side input terminal or the negative side input terminal of the differential amplifier section 205 in the state of FIG. 11B, and shows a result of the first readout controlling section 904 reading out the rough search data 902 in FIG. 9 in order from the readout position P20 to a readout position P17 and writing the rough search data 902 from the readout position P20 to the readout position P17 in the shift register 802 in the state of FIG. 11A.

Similarly, FIG. 11C shows that each electrode of the Y-axis electrode 210 is connected to the positive side input terminal or the negative side input terminal of the differential amplifier section 205 in the state of FIG. 11C, and shows a result of the first readout controlling section 904 reading out the rough search data 902 in FIG. 9 in order from a readout position P16 to a readout position P13 and writing the rough search data 902 from the readout position P16 to the readout position P13 in the shift register 802 in the state of FIG. 11B.

Similarly, FIG. 11D shows that each electrode of the Y-axis electrode 210 is connected to the positive side input terminal or the negative side input terminal of the differential amplifier section 205 in the state of FIG. 11D, and shows a result of the first readout controlling section 904 reading out the rough search data 902 in FIG. 9 in order from a readout position P12 to a readout position P9 and writing the rough search data 902 from the readout position P12 to the readout position P9 in the shift register 802 in the state of FIG. 11C.

In order to make a transition from the state of FIG. 11D to the state of FIG. 11A, the first readout controlling section 904 reads out the rough search data 902 in FIG. 9 in order from a readout position P8 to the readout position P1, and writes the rough search data 902 from the readout position P8 to the readout position P1 in the shift register 802 in the state of FIG. 11D.

That is, all the bits of the rough search data 902 are written to the shift register 802 only once when the shift register 802 is in an initial state (FIG. 11A). Thereafter, the rough search data 902 is read out from low-order bits to high-order bits of the rough search data 902 in the order of four bits (FIG. 11B), four bits (FIG. 11C), four bits (FIG. 11D), and eight bits (FIG. 11A), and written to the shift register 802.

As described above, the first readout controlling section 904 reads out the rough search data 902 in a direction from the bottom to the top of FIG. 9 while changing the readout position. That is, the first readout controlling section 904 reads out the rough search data 902 in the form of a loop in the direction from the bottom to the top of FIG. 9.

FIGS. 11E to 11S show transitions of the switch data output when the switch data generating section 207*b* is in the fine search mode.

FIG. 11E shows that each electrode of the Y-axis electrode 210 is connected to the positive side input terminal or the negative side input terminal of the differential amplifier section 205 in the state of FIG. 11E, and shows a result of the second readout controlling section 905 reading out the fine search data 903 in FIG. 9 in order from a readout position P20 to a readout position P1 and writing the fine search data 903 in the shift register 802.

FIG. 11F shows that each electrode of the Y-axis electrode 210 is connected to the positive side input terminal or the negative side input terminal of the differential amplifier section 205 in the state of FIG. 11F, and shows a result of the second readout controlling section 905 reading out only the bit of the readout position P20 of the fine search data 903 in FIG. 9 and writing the bit of the readout position P20 of the fine search data 903 in the shift register 802 in the state of FIG. 11E.

FIG. 11G shows that each electrode of the Y-axis electrode 210 is connected to the positive side input terminal or the negative side input terminal of the differential amplifier section 205 in the state of FIG. 11G, and shows a result of the second readout controlling section 905 reading out only the bit of a readout position P19 of the fine search data 903 in FIG. 9 and writing the bit of the readout position P19 of the fine search data 903 in the shift register 802 in the state of FIG. 11F.

Thereafter, similarly in FIGS. 11H to 11S, the second readout controlling section 905 reads out the fine search data 903 in FIG. 9 bit by bit to readout positions P18, P17, P16, . . . , and P7, and writes the fine search data 903 bit by bit in the shift register 802.

Then, in order to make a transition from the state of FIG. 11S to the state of FIG. 11E, the second readout controlling section 905 reads out data of six bits from a readout position P6 to the readout position P1 of the fine search data 903 in FIG. 9, and writes the data in the shift register 802.

In the fine search mode, however, the Y-axis electrode 210 does not make transitions from the state of FIG. 11E to the state of FIG. 11S. The fine search mode is a mode for finely detecting the position of a finger present within a region after the region where the finger is present is identified in advance in the rough search mode. Thus, in the fine search mode, a search is made only within the region identified in the rough search mode.

For example, when the presence of a finger is recognized in FIG. 11A in the rough search mode, the fine search mode repeats the states from FIG. 11E to FIG. 11J. In order to return from the state of FIG. 11J to the state of FIG. 11E, the second readout controlling section 905 reads out the fine search data 903 in FIG. 9 from the readout position P15 to the readout position P1, and writes the fine search data 903 from the readout position P15 to the readout position P1 in the shift register 802.

Similarly, when the presence of a finger is recognized in FIG. 11B in the fine search mode, the fine search mode repeats the states from FIG. 11I to FIG. 11N. In order to return from the state of FIG. 11N to the state of FIG. 11I, the second readout controlling section 905 reads out the fine search data 903 in FIG. 9 from the readout position P11 to the readout position P1 and further reads out the fine search data 903 from the readout position P20 to the readout position P17, and writes the fine search data 903 from the readout position P11 to the readout position P1 and from the readout position P20 to the readout position P17 in the shift register 802.

FIGS. 12A to 12Z are timing diagrams showing changes in the states of the X-axis electrode 209 and the Y-axis electrode 210. The timing diagrams of FIGS. 12A to 12Z are timing diagrams when the switch data of FIG. 11A and FIG. 11B is used.

FIGS. 12G to 12Z in a period from time t0 to time t1 of FIGS. 12A to 12Z correspond to the switch data of FIG. 11A. Similarly, FIGS. 12G to 12Z in a period from time t2 to time t3 of FIGS. 12A to 12Z correspond to FIG. 11B.

That is, FIGS. 12A to 12Z are timing diagrams showing changes in the states of the X-axis electrode 209 and the Y-axis electrode 210 in the rough search mode, and are diagrams extracting and showing the states of FIG. 11A and FIG. 11B of the Y-axis electrode 210.

FIGS. 12A to 12F show the timing of voltage applied to the X-axis electrode 209. The rectangular wave generating section 202 applies voltages shown in FIGS. 7B to 7H to the X-axis electrode 209. During this period, the Y-axis electrode 210 maintains a certain state. This period is the period from time t0 to time t1 in FIGS. 12A to 12Z and is also the period from time t2 to time t3 in FIGS. 12A to 12Z. That is, each pattern shown in FIG. 10 is switch data (connection pattern) for each electrode of the Y-axis electrode 210 when the rectangular wave generating section 202 performs scanning for one cycle of the X-axis electrode 209.

Therefore, in the rough search mode, the connection pattern of FIG. 12A is executed first, the connection pattern of FIG. 12B is executed next, the connection pattern of FIG. 12C is executed next, and the connection pattern of FIG. 12D is executed next. Thus, the first readout controlling section 904 periodically changes the readout start position of the rough search data 902 on the basis of the reset pulse and the switching signal.

The switch data read out by the first readout controlling section 904 is read into the register 803 in the reception selecting switch section 204 of FIG. 8 via the selector switch 907 and the shift register 802. Then, each electrode of the Y-axis electrode 210 is connected to the differential amplifier section 205 in the connection pattern read into the register 803.

The rough search mode is a high-speed search mode for determining whether there is a finger on the position detecting plane 102 and, when there is a finger on the position detecting plane 102, roughly grasping in which region the finger is present. FIGS. 13A, 13B, and 13C and FIGS. 14A, 14B, and 14C are schematic diagrams explaining an operation in the rough search mode.

Figure 13A:
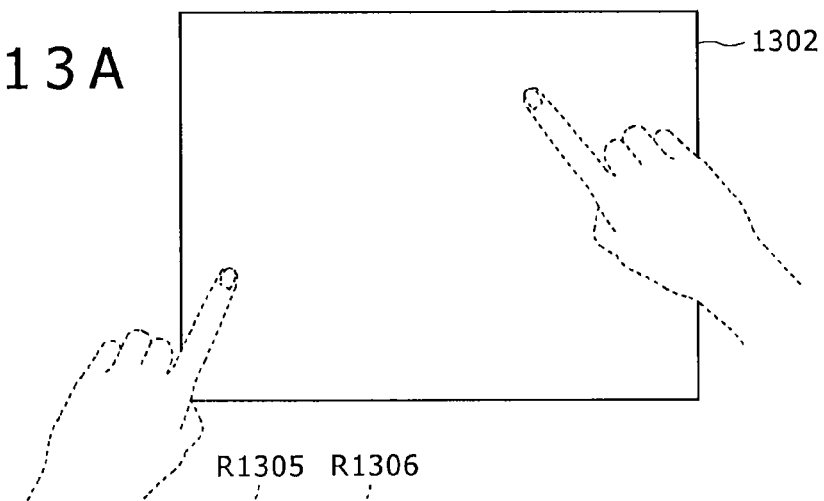
FIGS. 13A, 13B, and 13C are schematic diagrams explaining an operation in a rough search mode.
Figure 13B:
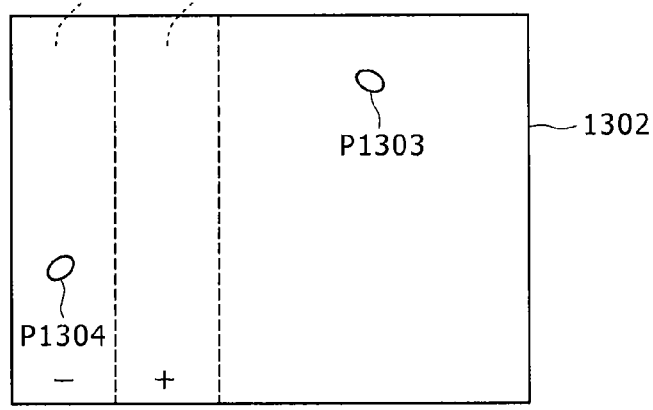

Now, suppose that a user touches the position detecting plane 1302 of the position detecting device 101 with index fingers of both hands, as shown in FIG. 13A. FIG. 13B shows a first stage of the rough search mode, in which stage the switch data of FIG. 11A is read into the register 803 through the shift register 802 in the reception selecting switch section 204 of FIG. 8 and each electrode of the Y-axis electrode 210 is connected to the differential amplifier section 205 in the connection pattern of FIG. 11A.

A part that the user touches with the index finger of the right hand is a position P1303. A part that the user touches with the index finger of the left hand is a position P1304.

The electrodes belonging to a first rough region R1305 of the Y-axis electrode 210 are connected to the negative side input terminal of the differential amplifier section 205, and thus form a negative electrode region. The electrodes of a second rough region R1306 of the Y-axis electrode 210 are connected to the positive side input terminal of the differential amplifier section 205, and thus form a positive electrode region. The electrodes of another region of the Y-axis electrode 210 are alternately connected to the positive side input terminal and the negative side input terminal of the differential amplifier section 205, and thus form an insensitive region.

The index finger of the left hand of the user (position P1304) is present in the first rough region R1305 of the position detecting plane 1302. Therefore the presence of the finger can be detected at this point in time.

Figure 13C:
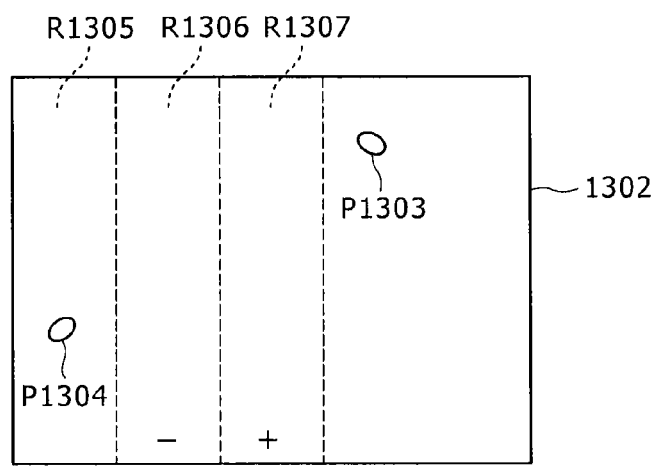

FIG. 13C shows a next stage of the rough search mode, in which stage the switch data of FIG. 11B is read into the register 803 through the shift register 802 in the reception selecting switch section 204 of FIG. 8 and each electrode of the Y-axis electrode 210 is connected to the differential amplifier section 205 in the connection pattern of FIG. 11B.

The electrodes of the first rough region R1305 of the Y-axis electrode 210 are alternately connected to the positive side input terminal and the negative side input terminal of the differential amplifier section 205, and thus form an insensitive region. The electrodes of the second rough region R1306 of the Y-axis electrode 210 are connected to the negative side input terminal of the differential amplifier section 205, and thus form a negative electrode region. The electrodes of a third rough region R1307 of the Y-axis electrode 210 are connected to the positive side input terminal of the differential amplifier section 205, and thus form a positive electrode region. The electrodes of another region of the Y-axis electrode 210 are alternately connected to the positive side input terminal and the negative side input terminal of the differential amplifier section 205, and thus form an insensitive region.

The index fingers of both hands of the user (positions P1303 and P1304) are present in the insensitive regions on the position detecting plane 1302. Therefore the presence of the fingers cannot be detected at this point in time.

Figure 14A:
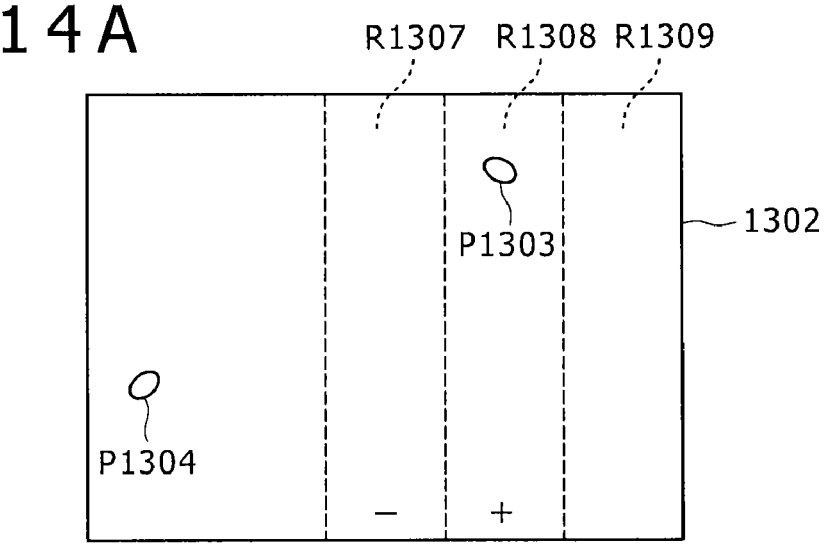
FIGS. 14A, 14B, and 14C are schematic diagrams explaining the operation in the rough search mode.

FIG. 14A shows a next stage of the rough search mode, in which stage the switch data of FIG. 11C is read into the register 803 through the shift register 802 in the reception selecting switch section 204 of FIG. 8 and each electrode of the Y-axis electrode 210 is connected to the differential amplifier section 205 in the connection pattern of FIG. 11C.

The electrodes of the first rough region R1305 and the second rough region R1306 of the Y-axis electrode 210 are alternately connected to the positive side input terminal and the negative side input terminal of the differential amplifier section 205, and thus form an insensitive region. The electrodes of a third rough region R1307 of the Y-axis electrode 210 are connected to the negative side input terminal of the differential amplifier section 205, and thus form a negative electrode region. The electrodes of a fourth rough region R1308 of the Y-axis electrode 210 are connected to the positive side input terminal of the differential amplifier section 205, and thus form a positive electrode region. The electrodes of a fifth rough region R1309 of the Y-axis electrode 210 are alternately connected to the positive side input terminal and the negative side input terminal of the differential amplifier section 205, and thus form an insensitive region.

The index finger of the right hand of the user (position P1303) is present in the fourth rough region R1308 on the position detecting plane 1302. Therefore the presence of the finger can be detected at this point in time.

Figure 14B:
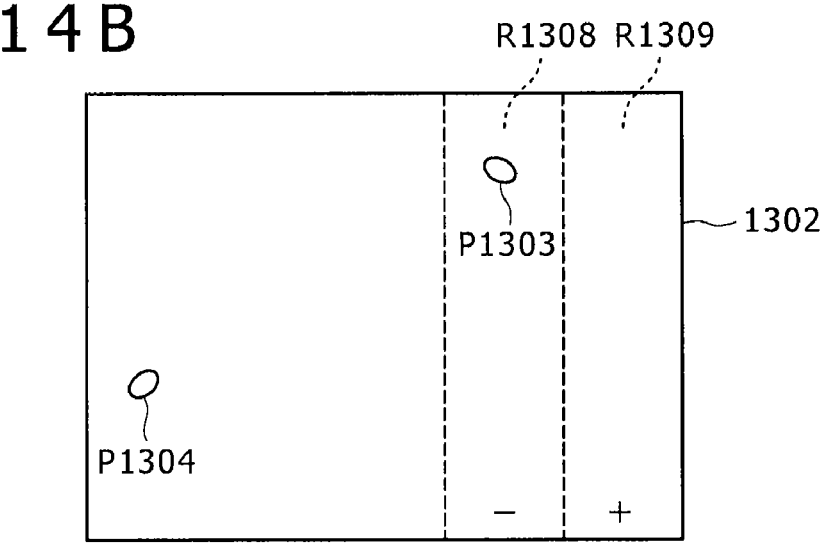

FIG. 14B shows a last stage of the rough search mode, in which stage the switch data of FIG. 11D is read into the register 803 through the shift register 802 in the reception selecting switch section 204 of FIG. 8 and each electrode of the Y-axis electrode 210 is connected to the differential amplifier section 205 in the connection pattern of FIG. 11D.

The electrodes of the first rough region R1305, the second rough region R1306, and the third rough region R1307 of the Y-axis electrode 210 are alternately connected to the positive side input terminal and the negative side input terminal of the differential amplifier section 205, and thus form an insensitive region. The electrodes of the fourth rough region R1308 of the Y-axis electrode 210 are connected to the negative side input terminal of the differential amplifier section 205, and thus form a negative electrode region. The electrodes of the fifth rough region R1309 of the Y-axis electrode 210 are connected to the positive side input terminal of the differential amplifier section 205, and thus form a positive electrode region. The index finger of the right hand of the user (position P1303) is present in the fourth rough region R1308 on the position detecting plane 1302. Therefore the presence of the finger can be detected at this point in time.

A judgment based on results of the above detection shows the possibility of fingers being present in the first rough region R1305 and the fourth rough region R1308, respectively, of the position detecting plane 1302. Accordingly, a transition is next made to the fine search mode.

The fine search mode uses only connection patterns corresponding to the regions where the presence of the fingers is identified. At this time, a search range is set somewhat wider than the range of the regions. This is shown in FIG. 14C.

Figure 14C:
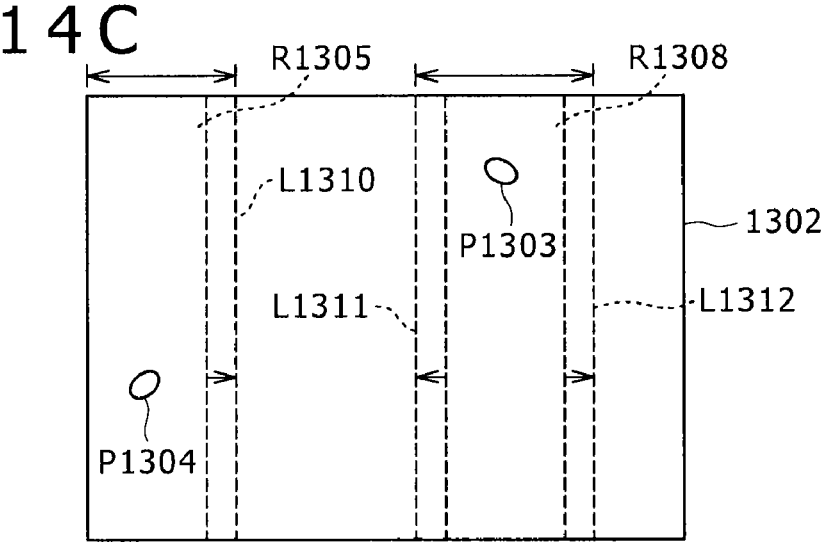
Figure 15:
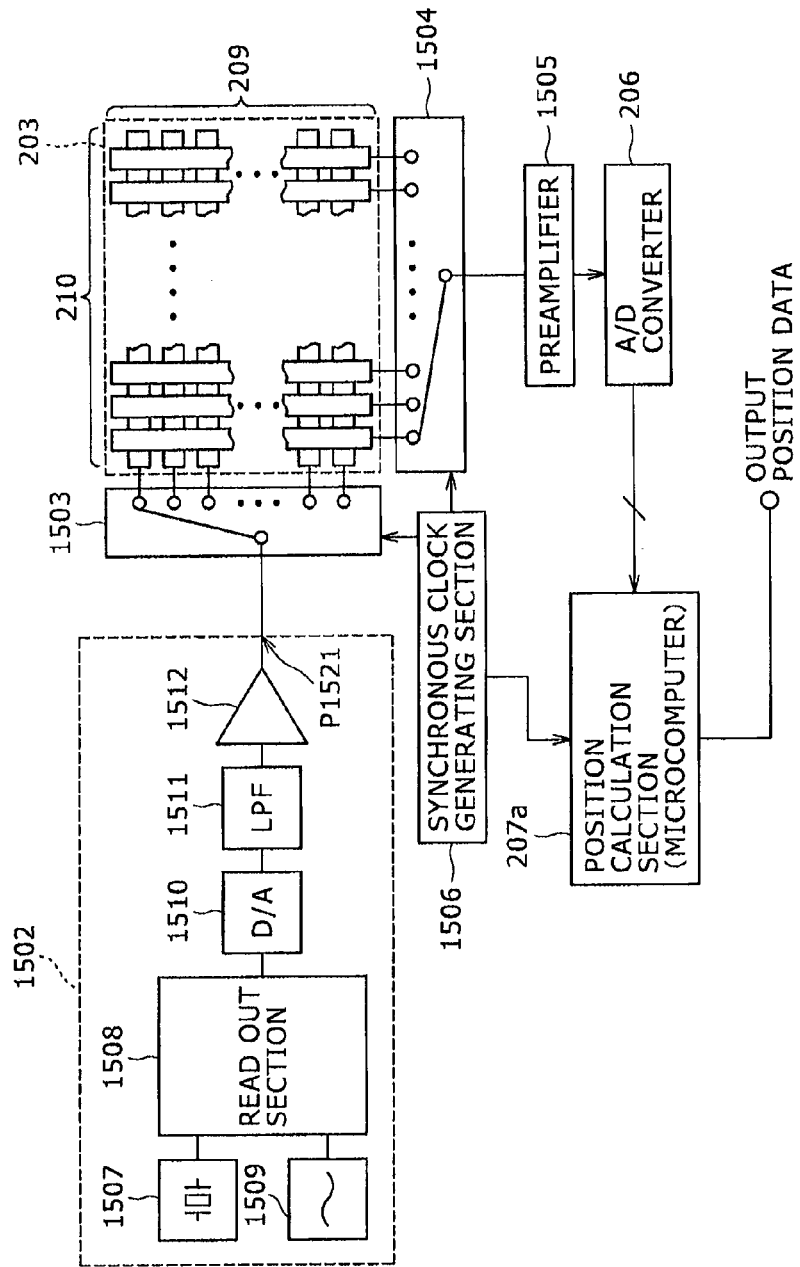
FIG. 15 is a block diagram showing a capacitance type position detecting device according to a conventional technique.

The patterns of FIGS. 11E, 11F, 11G, 11H, and 11I are used to search the first rough region R1305 shown in FIG. 14C. FIGS. 11E, 11F, 11G, and 11H suffice when only the range of the first rough region R1305 is searched. However, the pattern of FIG. 11I is also used for more reliability. At this time, a range obtained by somewhat widening the first rough region R1305 to a boundary line L1310 is searched.

The patterns of FIGS. 11L, 11M, 11N, 11O, and 11P are used to search the fourth rough region R1308 shown in FIG. 14C. FIGS. 11M, 11N, and 11O suffice when only the range of the fourth rough region R1308 is searched. However, the patterns of FIG. 11L and FIG. 11P are also used for more reliability. At this time, a range obtained by somewhat widening the fourth rough region R1308 to boundary lines L1311 and L1312 is searched.

The region determining section 407 in FIG. 4 at the time of the rough search mode determines the presence of a finger and a rough region on the position detecting plane 1302 as described above. When the region is determined, the region determining section 407 inverts the switching signal to make a transition to the fine search mode, and outputs information on the region where the presence of the finger is identified as a detected Y-axis address to the second readout controlling section 905 in FIG. 9.

The second readout controlling section 905 changes the readout position of the fine search data 903 on the basis of the detected Y-axis address supplied from the region determining section 407, and outputs switch data.

As described above, the readout position of the rough search data 902 and the fine search data 903 changes in an upward direction from the bottom of FIGS. 11A to 11S when the state of the Y-axis electrode 210 is changed. This readout position can be converted into the position of the Y-axis electrode 210, that is, a Y-axis address by a predefined rule.

As described with reference to FIGS. 13A to 14C, the presence of an insensitive region makes it possible to identify surely a region where a finger is present.

The present embodiment has examples of application as follows.

(1) The present embodiment has two modes, that is, the rough search mode and the fine search mode to detect the position of a finger. Advancing this technical idea, a plurality of rough search modes having regions of different sizes may be provided, and a transition may be made gradually from a rough search mode having extensive regions and performing high-speed scanning to rough search modes in which the size of regions is reduced. This exactly corresponds to an image of increasing the scale of a map.

(2) The insensitive regions in FIG. 10 are formed by a pattern of bits "0" and "1" repeated alternately, but are not limited to this as long as the insensitive regions form a certain repetitive pattern that prevents the detection of the presence of a finger. For example, a repetitive pattern "011001" or the like corresponds to this. In this case, there is a condition that the thickness and interval of electrodes of the Y-axis electrode 210 be sufficiently smaller than the thickness of fingers.

An insensitive region is realized by connecting, to one terminal of the differential amplifier section, a number of conductors which number is smaller than the number of adjacent conductors that are forming a region where a finger can be detected (which region will be referred to as a sensitive region) and that are connected to the same terminal of the differential amplifier section. For example, when a sensitive region is formed of a set of four conductors, it suffices for an insensitive region to be a repetitive pattern of a set of three conductors or less.

Incidentally, in order to ensure an effect of cancelling signals by the differential amplifier section 205, a total number of bits "0" and a total number of bits "1" are desirably the same when forming an insensitive region.

A position detecting device is disclosed in the present embodiment.

Electrodes on a receiving side of the capacitance type position detecting device are detected by a differential amplifier section, and there are provided a region having a plurality of electrodes connected to the negative side input terminal of the differential amplifier section, a region having a plurality of electrodes connected to the positive side input terminal of the differential amplifier section, and a region (insensitive region) having electrodes alternately connected to the negative side input terminal and the positive side input terminal of the differential amplifier section.

By adopting this configuration, every electrode on the receiving side is always connected to either the positive side input terminal or the negative side input terminal of the differential amplifier section. Thus, the number of terminals of switches connecting the receiving electrodes to the differential amplifier section can be reduced, and the switches can be of a simple configuration. In addition, an electrically floating state of the receiving electrodes is eliminated. Therefore the mixing in of noise is reduced as compared with the conventional techniques.

As a result, it is possible to provide a capacitance type position detecting device that is reduced in cost as compared with the conventional techniques but which can surely detect the presence of a plurality of fingers.

An embodiment of the present invention has been described above. However, the present invention is not limited to the above-described embodiment, but includes other examples of modification and examples of application without departing from the spirit of the present invention described in claims.

What is claimed is:
1. A position detecting device comprising:
a plurality of conductors arranged in parallel with each other in a first direction and supplied with a predetermined signal;
a plurality of conductors arranged in parallel with each other in a second direction orthogonal to the first direction;
a signal detecting circuit including a differential amplifier circuit having a first input terminal and a second input terminal and subjecting a signal input via the first input terminal and the second input terminal to differential amplification; and
a conductor selecting circuit for selectively connecting the plurality of conductors arranged in parallel with each other in said second direction to the first input terminal and the second input terminal of said differential amplifier circuit, whereby a position indicated by an indicating object is detected on a basis of an output signal from said signal detecting circuit;
wherein said selecting circuit further selects the plurality of conductors arranged in parallel with each other in said second direction with passage of time such that of the plurality of conductors arranged in parallel with each other in said second direction, M (M>=2) conductors adjacent to each other are connected to said first input terminal of said differential amplifier circuit, N (N>=2) conductors adjacent to each other, the N conductors being in proximity to said M conductors adjacent to each other, are connected to said second input terminal of said differential amplifier circuit, and 2P (P>=1) conductors adjacent to each other among the conductors excluding said M conductors and said N conductors, the number P being set smaller than said N, are divided into first and second groups of conductors, each group including P conductor(s), and the first group of P conductor(s) are connected to said first input terminal of said differential amplifier circuit and the second group of P conductor(s) are connected to said second input terminal of said differential amplifier circuit.

2. The position detecting device according to claim 1, wherein said selecting circuit connects each of a pair of conductors adjacent to each other among said 2P conductors to the first and second input terminals of said differential amplifier circuit, respectively.

3. The position detecting device according to claim 1, wherein said selecting circuit connects a conductor adjacent to said 2P conductors among the conductors excluding said M conductors, said N conductors, and said 2P conductors, to one of said first and second input terminals of said differential amplifier circuit.

4. The position detecting device according to claim 1, wherein the first group of conductors connected to the first input terminal and the second group of conductors connected to the second input terminal form a repetitive pattern.

5. The position detecting device according to claim 4, wherein the repetitive pattern is an alternating pattern.

6. The position detecting device according to claim 1, further comprising a signal supplying circuit for supplying said predetermined signal, wherein the signal supplying circuit sequentially supplies said signal to the plurality of conductors arranged in parallel with each other in said first direction at certain time intervals.

7. The position detecting device according to claim 6, wherein said signal is a pulse wave having a predetermined width, and said signal supplying circuit performs control such that said certain time intervals are an integral multiple of the pulse width of said signal.

8. The position detecting device according to claim 7, wherein said signal is supplied such that a level at a time of rising of said signal and a level at a time of falling of said signal are substantially the same.

9. A position detecting method of a position detecting device, said position detecting device including a plurality of conductors arranged in parallel with each other in a first direction and supplied with a predetermined signal, a plurality of conductors arranged in parallel with each other in a second direction orthogonal to the first direction, a signal detecting circuit including a differential amplifier circuit having a first input terminal and a second input terminal and subjecting a signal input via the first input terminal and the second input terminal to differential amplification, and a conductor selecting circuit for selectively connecting the plurality of conductors arranged in parallel with each other in said second direction to the first input terminal and the second input terminal of said differential amplifier circuit, whereby a position indicated by an indicating object is detected on a basis of an output signal from said signal detecting circuit, said position detecting method comprising the step of:

said selecting circuit selecting the plurality of conductors arranged in parallel with each other in said second direction with passage of time such that of the plurality of conductors arranged in parallel with each other in said second direction, M (M>=2) conductors adjacent to each other are connected to said first input terminal of said differential amplifier circuit, N (N>=2) conductors adjacent to each other, the N conductors being in proximity to said M conductors adjacent to each other, are connected to said second input terminal of said differential amplifier circuit, and 2P (P>=1) conductors adjacent to each other among the conductors excluding said M conductors and said N conductors, the number P being set smaller than said N, are divided into first and second groups of conductors, each group including P conductor(s), and the first group of P conductor(s) are connected to said first input terminal of said differential amplifier circuit and the second group of P conductor(s) are connected to said second input terminal of said differential amplifier circuit.

* * * * *